(12) United States Patent
Khoshnevisan et al.

(10) Patent No.: US 12,538,296 B2
(45) Date of Patent: Jan. 27, 2026

(54) MANAGEMENT OF CONCURRENT UPLINK SHARED CHANNEL TRANSMISSIONS

(71) Applicant: QUALCOMM Incorporated, San Diego, CA (US)

(72) Inventors: Mostafa Khoshnevisan, San Diego, CA (US); Rajat Prakash, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 17/491,270

(22) Filed: Sep. 30, 2021

(65) Prior Publication Data

US 2023/0115082 A1    Apr. 13, 2023

(51) Int. Cl.
*H04W 72/1268*    (2023.01)
*H04L 5/00*    (2006.01)
*H04W 72/0446*    (2023.01)
*H04W 72/23*    (2023.01)

(52) U.S. Cl.
CPC ......... *H04W 72/1268* (2013.01); *H04L 5/001* (2013.01); *H04L 5/0044* (2013.01); *H04W 72/0446* (2013.01); *H04W 72/23* (2023.01)

(58) Field of Classification Search
CPC ......... H04W 72/0446; H04W 72/1268; H04W 72/23; H04W 72/569; H04W 72/232; H04L 5/0044; H04L 5/0094; H04L 5/001
See application file for complete search history.

(56) References Cited

U.S. PATENT DOCUMENTS

2020/0196343 A1*  6/2020  Marinier ............... H04L 1/1896
2020/0296701 A1   9/2020  Park et al.
2020/0351801 A1   11/2020 Jeon et al.
2021/0029719 A1*  1/2021  Zhou .................... H04L 5/0055
(Continued)

FOREIGN PATENT DOCUMENTS

WO    WO-2020197320 A1    10/2020
WO    WO-2021007822 A1    1/2021
WO    WO-2022027640 A1 *  2/2022 ........... H04L 5/0035

OTHER PUBLICATIONS

US 12,047,956 B2, 07/2024, Bae (withdrawn)*
International Search Report and Written Opinion—PCT/US2022/041919—ISA/EPO—Dec. 6, 2022.

*Primary Examiner* — Shah M Rahman
(74) *Attorney, Agent, or Firm* — Holland & Hart LLP/Qualcomm Incorporated

(57) ABSTRACT

Methods, systems, and devices for wireless communications are described. A user equipment (UE) may be configured to receive, from a base station, signaling that schedules a first uplink shared channel message and a second uplink shared channel message (e.g., physical uplink shared channel (PUSCH) messages) from the UE to the base station within a first component carrier. The first and second uplink shared channel messages may at least partially overlap, where at least one of the first or second uplink shared channel messages includes a configured grant uplink shared channel message (CG-PUSCH). The UE may transmit the first and second uplink shared channel messages to the base station in accordance with a transmission configuration for transmitting temporally overlapping uplink shared channel messages.

30 Claims, 13 Drawing Sheets

(56) References Cited

U.S. PATENT DOCUMENTS

| | | | | |
|---|---|---|---|---|
| 2022/0046671 A1* | 2/2022 | Yang | H04L 5/0078 |
| 2022/0086849 A1* | 3/2022 | Lee | H04W 72/56 |
| 2022/0095335 A1* | 3/2022 | Gao | H04L 1/189 |
| 2022/0104208 A1* | 3/2022 | Chen | H04W 72/56 |
| 2022/0159668 A1* | 5/2022 | Chin | H04W 72/56 |
| 2022/0174682 A1* | 6/2022 | Li | H04W 72/1263 |
| 2022/0232489 A1* | 7/2022 | Zhang | H04W 52/365 |
| 2022/0338241 A1* | 10/2022 | Chin | H04W 72/566 |
| 2023/0024055 A1* | 1/2023 | Lu | H04W 72/1268 |
| 2023/0029745 A1* | 2/2023 | Cui | H04W 72/54 |
| 2023/0032475 A1* | 2/2023 | Bae | H04L 5/0092 |
| 2023/0042048 A1* | 2/2023 | Kim | H04B 7/063 |
| 2023/0043851 A1* | 2/2023 | Ouchi | H04W 72/23 |
| 2023/0123957 A1* | 4/2023 | Jung | H04L 5/0094 370/329 |
| 2023/0125953 A1* | 4/2023 | Hurd | H04L 5/0078 370/329 |
| 2023/0132942 A1* | 5/2023 | Xiong | H04W 74/0841 370/329 |
| 2023/0143675 A1* | 5/2023 | Li | H04W 72/56 370/329 |
| 2023/0156799 A1* | 5/2023 | Jiang | H04W 16/14 370/329 |
| 2023/0179350 A1* | 6/2023 | Rossbach | H04W 72/21 370/336 |
| 2023/0180245 A1* | 6/2023 | Bae | H04B 7/0626 |
| 2023/0189255 A1* | 6/2023 | Bagheri | H04L 1/1812 370/329 |
| 2023/0189260 A1* | 6/2023 | Bae | H04W 72/1268 370/329 |
| 2023/0198679 A1* | 6/2023 | Bae | H04L 1/1812 370/329 |
| 2023/0199735 A1* | 6/2023 | Li | H04W 74/006 370/336 |
| 2023/0292310 A1* | 9/2023 | Li | H04W 72/23 |
| 2023/0403702 A1* | 12/2023 | Su | H04W 28/18 |
| 2024/0064527 A1* | 2/2024 | Matsumura | H04W 72/21 |
| 2024/0089062 A1* | 3/2024 | Lin | H04L 5/0044 |

* cited by examiner

Logical Channel Prioritization Enabled or Disabled

Logical Channel Prioritization Disabled

☐ DCI Message 310
▦ DG-PUSCH 315
▨ CG-PUSCH 320

300

Logical Channel Prioritization Enabled

MANAGEMENT OF CONCURRENT UPLINK SHARED CHANNEL TRANSMISSIONS

FIELD OF TECHNOLOGY

The following relates to wireless communications, including techniques for performing overlapping configured grant and dynamic grant physical uplink shared channel (PUSCH) transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, UEs may not be able to transmit multiple uplink shared channel messages (e.g., physical uplink shared channel (PUSCH) messages) which overlap in time. As such, when a UE is scheduled to transmit an overlapping PUSCH messages, the UE may have to drop one of the overlapping PUSCH messages according to some conventional techniques.

SUMMARY

The described techniques relate to improved methods, systems, devices, and apparatuses that support techniques for performing overlapping configured grant and dynamic grant physical uplink shared channel (PUSCH) transmissions. Generally, aspects of the present disclosure provide techniques which enable user equipments (UEs) to transmit multiple PUSCH messages which overlap in time, including at least one CG-PUSCH message. In particular, aspects of the present disclosure describe transmission configurations associated with different sets of rules which enable UEs to determine whether multiple overlapping PUSCH messages including at least one CG-PUSCH may be simultaneously transmitted. For example, a UE may receive signaling which schedules multiple PUSCH messages (including at least one CG-PUSCH) which at least partially overlap in time with one another. In this example, the UE may be configured to transmit the multiple overlapping PUSCH messages in accordance with a transmission configuration. The transmission configuration may define a set of rules for transmitting temporally overlapping PUSCH messages. In some cases, a first transmission configuration may enable the UE to transmit temporally overlapping PUSCH messages if the PUSCH messages belong to different PUSCH groups. where a second transmission configuration may enable the UE to transmit temporally overlapping PUSCH messages based on a relative priority (e.g., logical channel priority) of the PUSCH messages and/or the types of PUSCH messages (e.g., dynamic grant or configured grant messages).

A method for wireless communication at a UE is described. The method may include receiving, from a base station, first signaling that schedules a first uplink shared channel message from the UE to the base station within a first component carrier, receiving, from the base station, second signaling that schedules a second uplink shared channel message from the UE to the base station within the first component carrier, where the second uplink shared channel message at least partially overlaps in time with the first uplink shared channel message, and where at least one of the first uplink shared channel message or the second uplink shared channel message includes a configured grant uplink shared channel message, and transmitting the first and second uplink shared channel messages to the base station in accordance with a transmission configuration for transmitting temporally overlapping uplink shared channel messages.

An apparatus for wireless communication at a UE is described. The apparatus may include a processor, a transceiver coupled with the processor, and memory coupled with the processor. The memory and the processor may be configured to cause the apparatus to receive, from a base station, first signaling that schedules a first uplink shared channel message from the UE to the base station within a first component carrier, receive, from the base station, second signaling that schedules a second uplink shared channel message from the UE to the base station within the first component carrier, where the second uplink shared channel message at least partially overlaps in time with the first uplink shared channel message, and where at least one of the first uplink shared channel message or the second uplink shared channel message includes a configured grant uplink shared channel message, and transmit the first and second uplink shared channel messages to the base station in accordance with a transmission configuration for transmitting temporally overlapping uplink shared channel messages.

Another apparatus for wireless communication at a UE is described. The apparatus may include means for receiving, from a base station, first signaling that schedules a first uplink shared channel message from the UE to the base station within a first component carrier, means for receiving, from the base station, second signaling that schedules a second uplink shared channel message from the UE to the base station within the first component carrier, where the second uplink shared channel message at least partially overlaps in time with the first uplink shared channel message, and where at least one of the first uplink shared channel message or the second uplink shared channel message includes a configured grant uplink shared channel message, and means for transmitting the first and second uplink shared channel messages to the base station in accordance with a transmission configuration for transmitting temporally overlapping uplink shared channel messages.

A non-transitory computer-readable medium storing code for wireless communication at a UE is described. The code may include instructions executable by a processor to receive, from a base station, first signaling that schedules a first uplink shared channel message from the UE to the base station within a first component carrier, receive, from the base station, second signaling that schedules a second uplink shared channel message from the UE to the base station within the first component carrier, where the second uplink shared channel message at least partially overlaps in time with the first uplink shared channel message, and where at least one of the first uplink shared channel message or the second uplink shared channel message includes a configured grant uplink shared channel message, and transmit the first and second uplink shared channel messages to the base station in accordance with a transmission configuration for transmitting temporally overlapping uplink shared channel messages.

In some examples of the method, apparatuses, and non-transitory computer-readable medium described herein, transmitting the first and second uplink shared channel messages in accordance with the transmission configuration may include operations, features, means, or instructions for transmitting the first and second uplink shared channel messages based on a comparison of a first set of one or more parameters associated with the first uplink shared channel message and a second set of one or more parameters associated with the second uplink shared channel message, where the first set of one or more parameters, the second set of one or more parameters, or both, correspond to a grouping of uplink shared channel messages, include a logical channel priority, or both.

Some examples of the method, apparatuses, and non-transitory computer-readable medium described herein may further include operations, features, means, or instructions for receiving, from the base station, an indication of the transmission configuration, where transmitting the first and second uplink shared channel messages may be based on receiving the indication of the transmission configuration.

In some examples of the method, apparatuses, and non-transitory computer-readable medium described herein, transmitting the first and second uplink shared channel messages in accordance with the transmission configuration may include operations, features, means, or instructions for transmitting the first and second uplink shared channel messages based on the first uplink shared channel message being associated with a first set of uplink shared channel messages and the second uplink shared channel message being associated with a second set of uplink shared channel messages that may be different from the first set of uplink shared channel messages.

Some examples of the method, apparatuses, and non-transitory computer-readable medium described herein may further include operations, features, means, or instructions for identifying that the first uplink shared channel message and the second uplink shared channel message belong to the first and second sets of uplink shared channel messages, respectively, based on a first control resource set (CORE-SET) pool index associated with the first uplink shared channel message being different than a second CORESET pool index associated with the second uplink shared channel message, where transmitting the first and second uplink shared channel messages in accordance with the transmission configuration may be based on the identifying.

In some examples of the method, apparatuses, and non-transitory computer-readable medium described herein, the first uplink shared channel message includes the configured grant uplink shared channel message and the first signaling includes a radio resource control (RRC) message and the method, apparatuses, and non-transitory computer-readable medium may include further operations, features, means, or instructions for identifying the first CORESET pool index associated with the first uplink shared channel message based on one or more parameters received via the RRC message, a CORESET associated with the downlink control information (DCI) message, or both.

Some examples of the method, apparatuses, and non-transitory computer-readable medium described herein may further include operations, features, means, or instructions for identifying that the first uplink shared channel message and the second uplink shared channel message belong to the first and second sets of uplink shared channel messages, respectively, based on a first uplink beam group associated with the first uplink shared channel message being different than a second uplink beam group associated with the second uplink shared channel message, where transmitting the first and second uplink shared channel messages in accordance with the transmission configuration may be based on the identifying.

Some examples of the method, apparatuses, and non-transitory computer-readable medium described herein may further include operations, features, means, or instructions for identifying the first uplink beam group, the second uplink beam group, or both, based on one or more parameters associated with the first uplink shared channel message and the second uplink shared channel message, the one or more parameters including a UE panel identifier, an uplink transmission configuration indicator (TCI), a sounding reference signal (SRS) resource set identifier, or any combination thereof.

Some examples of the method, apparatuses, and non-transitory computer-readable medium described herein may further include operations, features, means, or instructions for identifying that the first uplink shared channel message and the second uplink shared channel message belong to the first and second sets of uplink shared channel messages, respectively, based on a first set of one or more parameters associated with the first uplink shared channel message being different than a second set of one or more parameters associated with the second uplink shared channel message, where transmitting the first and second uplink shared channel messages may be based on the identifying, where the first set of one or more parameters may be different from the second set of one or more parameters.

In some examples of the method, apparatuses, and non-transitory computer-readable medium described herein, the first set of one or more parameters, the second set of one or more parameters, or both, include an uplink power control closed loop index, an antenna port, a code division multiplexing (CDM) group, a timing advance group (TAG) identifier, a physical cell identifier (PCI), a synchronization signal block (SSB) set, or any combination thereof.

Some examples of the method, apparatuses, and non-transitory computer-readable medium described herein may further include operations, features, means, or instructions for receiving, from the base station, third signaling that schedules a third uplink shared channel message from the UE to the base station within the first component carrier, where the third uplink shared channel message at least partially overlaps in time with the first uplink shared channel message and refraining from transmitting the third uplink shared channel message in accordance with the transmission configuration based on the first uplink shared channel message and the third uplink shared channel message at least partially overlapping in time and being associated with a same set of uplink shared channel messages.

In some examples of the method, apparatuses, and non-transitory computer-readable medium described herein, the first uplink shared channel message includes a dynamic grant uplink shared channel message and the method, apparatuses, and non-transitory computer-readable medium may include further operations, features, means, or instructions for refraining from transmitting the third uplink shared channel message in accordance with the transmission configuration based on the third uplink shared channel message including a second configured grant uplink shared channel message.

Some examples of the method, apparatuses, and non-transitory computer-readable medium described herein may further include operations, features, means, or instructions for refraining from transmitting the third uplink shared channel message in accordance with the transmission configuration based on the third uplink shared channel message having a second logical channel priority that may be less than or equal to a first logical channel priority associated with the first uplink shared channel message.

In some examples of the method, apparatuses, and non-transitory computer-readable medium described herein, the first uplink shared channel message includes a dynamic grant uplink shared channel message and the method, apparatuses, and non-transitory computer-readable medium may include further operations, features, means, or instructions for refraining from transmitting the third uplink shared channel message in accordance with the transmission configuration based on a time interval between the DCI message and the third uplink shared channel message satisfying a threshold time interval.

Some examples of the method, apparatuses, and non-transitory computer-readable medium described herein may further include operations, features, means, or instructions for receiving, from the base station, third signaling that schedules a third uplink shared channel message from the UE to the base station within the first component carrier, where the third uplink shared channel message at least partially overlaps in time with the first and second uplink shared channel messages and refraining from transmitting the third uplink shared channel message in accordance with the transmission configuration based on the third uplink shared channel message at least partially overlapping in time with the first and second uplink shared channel messages and based on a set of uplink shared channel messages associated with the third uplink shared channel message, a logical channel priority associated with the third uplink shared channel message, or both.

In some examples of the method, apparatuses, and non-transitory computer-readable medium described herein, the first uplink shared channel message includes the configured grant uplink shared channel message and the method, apparatuses, and non-transitory computer-readable medium may include further operations, features, means, or instructions for receiving, from the base station, third signaling that schedules a third uplink shared channel message from the UE to the base station within the first component carrier, where the third uplink shared channel message at least partially overlaps in time with the first and second uplink shared channel messages and refraining from transmitting the third uplink shared channel message in accordance with the transmission configuration based on the third uplink shared channel message at least partially overlapping in time with the first and second uplink shared channel messages, and based on both the first and third uplink shared channel messages including configured grant uplink shared channel messages.

Some examples of the method, apparatuses, and non-transitory computer-readable medium described herein may further include operations, features, means, or instructions for refraining from transmitting the third uplink shared channel message in accordance with the transmission configuration based at least on part on a first set of one or more parameters associated with the first uplink shared channel message and a second set of one or more parameters associated with the third uplink shared channel message, where the first set of one or more parameters, the second set of one or more parameters, or both, includes a configured grant index, a periodicity, an initial transmit time, a duration, a quantity of resource blocks, an extent of temporal overlap with the second uplink shared channel message, an extent of frequency overlap with the second uplink shared channel message, a demodulation reference signal (DMRS) symbol location, a CDM group, or any combination thereof.

In some examples of the method, apparatuses, and non-transitory computer-readable medium described herein, the third uplink shared channel message includes a second configured grant uplink shared channel message and the method, apparatuses, and non-transitory computer-readable medium may include further operations, features, means, or instructions for transmitting the first uplink shared channel message based on a first time interval between the DCI message and the first uplink shared channel message satisfying a threshold time interval.

Some examples of the method, apparatuses, and non-transitory computer-readable medium described herein may further include operations, features, means, or instructions for receiving, from the base station, third signaling that schedules a first dynamic grant uplink shared channel message and a second dynamic grant uplink shared channel message from the UE to the base station within a second component carrier, receiving, from the base station, fourth signaling that schedules a second configured grant uplink shared channel message from the UE to the base station within the second component carrier, where the second configured grant uplink shared channel message at least partially overlaps in time with the first and second dynamic grant uplink shared channel messages, and refraining from transmitting the second configured grant uplink shared channel message based on the second configured grant uplink shared channel message at least partially overlapping in time with the first and second dynamic grant uplink shared channel messages.

Some examples of the method, apparatuses, and non-transitory computer-readable medium described herein may further include operations, features, means, or instructions for receiving, from the base station, third signaling that schedules a third uplink shared channel message from the UE to the base station within the first component carrier, where the third uplink shared channel message at least partially overlaps in time with the first and second uplink shared channel messages and refraining from transmitting the third uplink shared channel message based on the third uplink shared channel message at least partially overlapping in time with the first and second uplink shared channel messages, and based on the third uplink shared channel message having a third logical channel priority that may be less than or equal to a first logical channel priority associated with the first uplink shared channel message and a second logical channel priority associated with the first uplink shared channel message.

In some examples of the method, apparatuses, and non-transitory computer-readable medium described herein, the first uplink shared channel message includes a first configured grant uplink shared channel message and the second uplink shared channel message includes a second configured grant uplink shared channel message.

DETAILED DESCRIPTION

Figure 1:
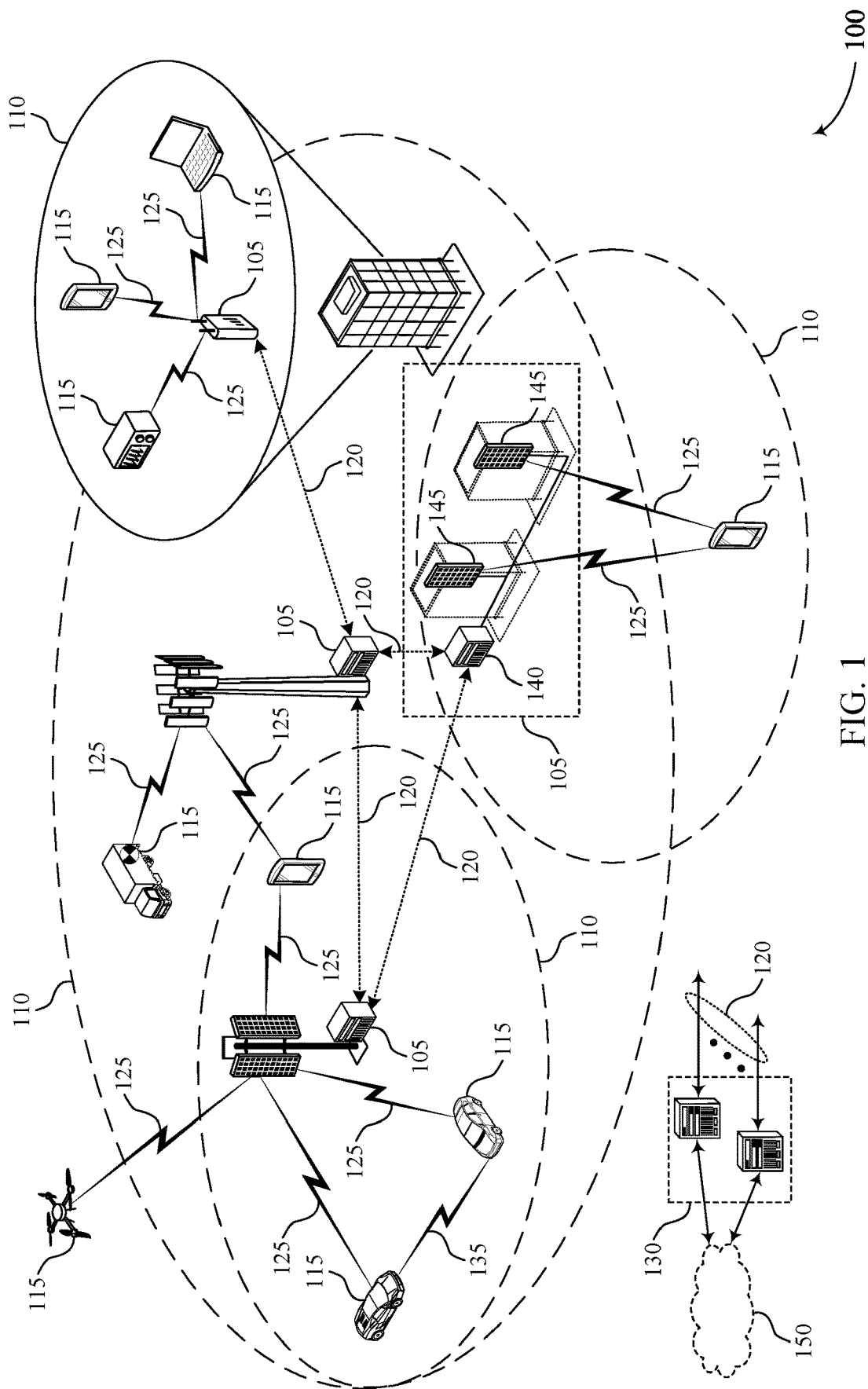
FIG. 1 illustrates an example of a wireless communications system that supports techniques for performing overlapping configured grant and dynamic grant physical uplink shared channel (PUSCH) transmissions in accordance with aspects of the present disclosure.

In some wireless communications systems, the network may schedule wireless devices, such as user equipments (UEs), to transmit messages within sets of configured uplink occasions. For example, a configured grant may schedule the UE to transmit physical uplink shared channel (PUSCH) messages (e.g., configured grant PUSCH (CG-PUSCH) messages) within a set of transmission occasions scheduled via the configured grant. Additionally, some wireless communications systems may enable the network to dynamically schedule UEs to transmit messages via dynamic grants (e.g., downlink control information (DCI) messages that dynamically schedule a dynamic grant PUSCH (DG-PUSCH) message). However, some wireless communications systems may not allow UEs to transmit at least some types of PUSCH messages simultaneously. For example, according to some conventional techniques, UEs may not be able to transmit a CG-PUSCH message and a DG-PUSCH message which overlap in time. Similarly, UEs may not be able to transmit multiple CG-PUSCH messages which overlap in time. As such, when a UE is scheduled to transmit a CG-PUSCH message that overlaps in time with a GD-PUSCH message or another CG-PUSCH message, the UE may have to drop one of the overlapping PUSCH messages.

Accordingly, aspects of the present disclosure are directed to techniques which enable UEs to transmit multiple PUSCH messages which overlap in time, including at least one CG-PUSCH message. In particular, aspects of the present disclosure provide for transmission configurations which define different sets of rules which enable UEs to determine whether multiple overlapping PUSCH messages including at least one CG-PUSCH may be simultaneously transmitted.

For example, a UE may receive signaling (e.g., radio resource control (RRC) signaling, DCI messages, or a combination thereof) which schedules multiple PUSCH messages (including at least one CG-PUSCH) which at least partially overlap in time with one another. In this example, the UE may be configured to transmit the multiple overlapping PUSCH messages (e.g., CG-PUSCH+DG-PUSCH, or CG-PUSCH+CG-PUSCH) in accordance with a transmission configuration. The transmission configuration may define a set of rules for transmitting temporally overlapping PUSCH messages.

In some cases, a first transmission configuration may enable the UE to transmit temporally overlapping PUSCH messages if the PUSCH messages belong to different PUSCH groups. In such cases, PUSCH groups for the respective PUSCHs may be determined according to a number of different parameters, including control resource set (CORESET) indexes (e.g., CORESETPoolIndexes), antenna panels, transmission configuration indicator (TCI) states, antenna ports, uplink beam groups, and the like. In other cases, a second transmission configuration may enable the UE to transmit temporally overlapping PUSCH messages based on a relative priority (e.g., logical channel priority) of the PUSCH messages and/or the types of PUSCH messages (e.g., dynamic grant or configured grant messages). In some aspects, transmission configurations for transmitting temporally overlapping PUSCHs may be configured at the UE, signaled to the UE via the network, or both.

Aspects of the disclosure are initially described in the context of wireless communications systems. Aspects of the disclosure are further described in the context of example resource configurations and an example process flow. Aspects of the disclosure are further illustrated by and described with reference to apparatus diagrams, system diagrams, and flowcharts that relate to techniques for performing overlapping configured grant and dynamic grant PUSCH transmissions.

FIG. 1 illustrates an example of a wireless communications system 100 that supports techniques for performing overlapping configured grant and dynamic grant PUSCH transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support techniques which enable UEs 115 to transmit multiple PUSCH messages which overlap in time, including at least one CG-PUSCH message. In particular, the UEs 115 and the base stations 105 of the wireless communications system 100 may support transmission configurations which define different sets of rules which enable UEs 115 to determine whether multiple overlapping PUSCH messages including at least one CG-PUSCH may be simultaneously transmitted.

For example, a UE 115 of the wireless communications system 100 may receive signaling (e.g., RRC signaling, DCI messages, or a combination thereof) which schedules multiple PUSCH messages (including at least one CG-PUSCH) which at least partially overlap in time with one another. In this example, the UE 115 may be configured to transmit the multiple overlapping PUSCH messages (e.g., CG-PUSCH+DG-PUSCH, or CG-PUSCH+CG-PUSCH) in accordance with a transmission configuration. The transmission configuration may define a set of rules for transmitting temporally overlapping PUSCH messages.

In some cases, a first transmission configuration may enable the UE 115 to transmit temporally overlapping PUSCH messages if the PUSCH messages belong to different PUSCH groups. In such cases, PUSCH groups for the respective PUSCHs may be determined according to a number of different parameters, including CORESET-PoolIndexes, antenna panels, TCI states, antenna ports, uplink beam groups, and the like. In other cases, a second transmission configuration may enable the UE 115 to transmit temporally overlapping PUSCH messages based on a relative priority (e.g., logical channel priority) of the PUSCH messages and/or the types of PUSCH messages (e.g., dynamic grant or configured grant messages). In some aspects, transmission configurations for transmitting temporally overlapping PUSCHs may be configured at the UE 115, signaled to the UE 115 via the network, or both.

Techniques described herein may facilitate more efficient use of resources by enabling UEs 115 to transmit PUSCH messages which at least partially overlap in time. In particular, techniques described herein may enable UEs 115 to transmit CG-PUSCHs which at least partially overlap in the time domain with other PUSCHs, such as another CG-PUSCH or a DG-PUSCH. Accordingly, techniques described herein may enable more efficient scheduling of uplink communications at UEs 115, reduce latency, and lead to a more efficient use of resources within the wireless communications system 100.

Figure 2:
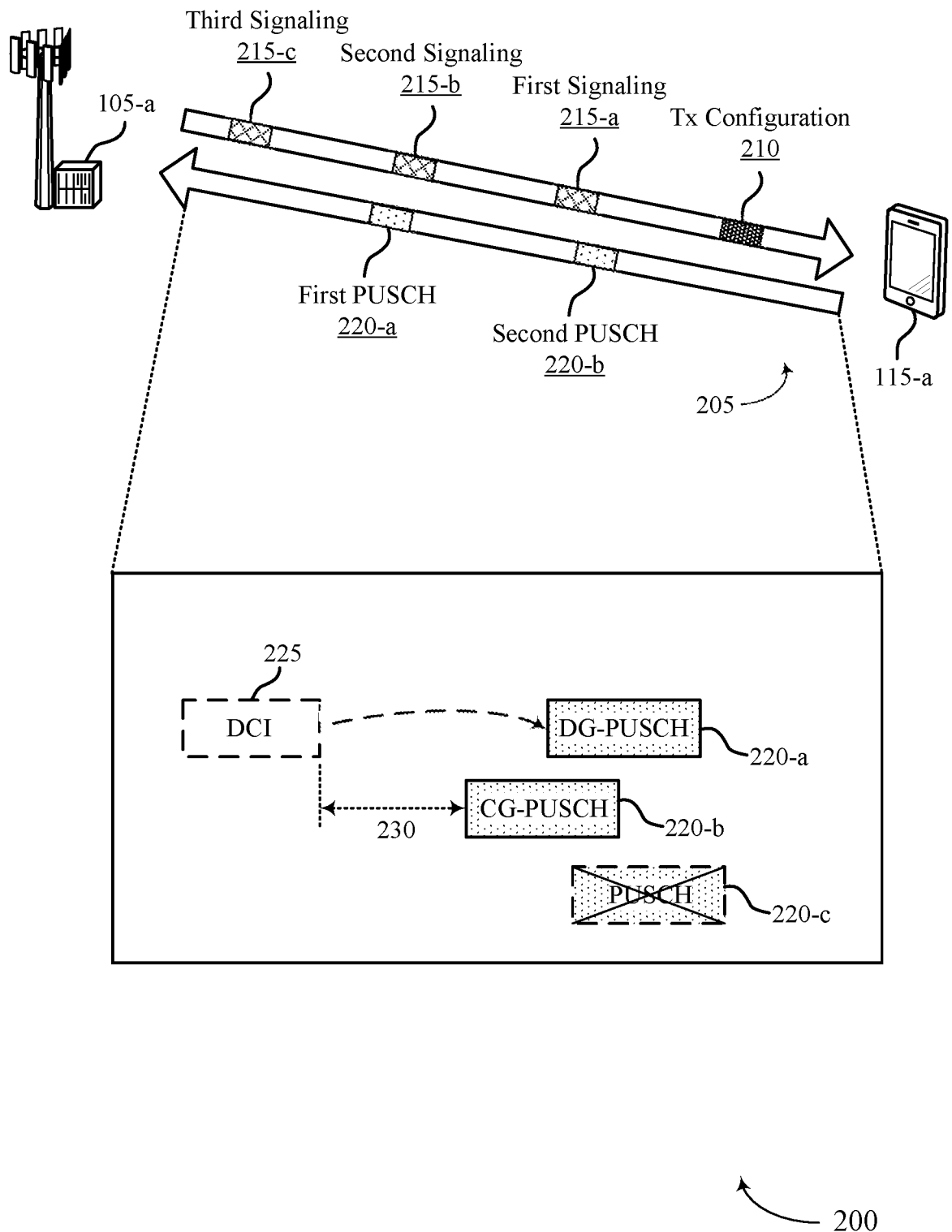
FIG. 2 illustrates an example of a wireless communications system that supports techniques for performing overlapping configured grant and dynamic grant PUSCH transmissions in accordance with aspects of the present disclosure.

FIG. 2 illustrates an example of a wireless communications system 200 that supports techniques for performing overlapping configured grant and dynamic grant PUSCH transmissions in accordance with aspects of the present disclosure. In some examples, wireless communications system 200 may implement, or be implemented by, aspects of wireless communications system 100. Wireless communications system 200 may support techniques for performance of temporally overlapping PUSCH transmissions, as described in FIG. 1.

The wireless communications system 200 may include a UE 115-a and a base station 105-a, which may be examples of UEs 115, base stations 105, and other wireless devices as described with reference to FIG. 1. In some aspects, the UE 115-a may communicate with the base station 105-a using a communication links 205, which may be an example of an NR or LTE link between a base station 105-a and the UE 115-a. In some aspects, the communication link 205 between the base station 105-a and the UE 115-a may include an example of an access link (e.g., Uu link) which may include a bi-directional link that enables both uplink and downlink communication.

The wireless communications system 200 may support uplink configured grant communications (e.g., CG-PUSCHs) in which the base station 105-a schedules the UE 115-a to transmit uplink messages within sets of configured uplink occasions. The wireless communications system 200 may support multiple types of uplink configured grant communications, including uplink configured grant Type 1 and uplink configured grant Type 2. A configured grant message (e.g., CG-PUSCH message) may refer to a message transmitted within a transmission occasion configured via upper layer (e.g., RRC) signaling as part of a recurring (e.g., periodic) set of transmission occasions, where the particular transmission occasion within which the configured grant message is transmitted is activated via upper layer (e.g., RRC) and/or lower layer (e.g., DCI) signaling, and where one or more transmission parameters for the configured grant message are configured via the upper layer signaling.

In the context of Type 1 uplink configured grants, the base station 105-a may configure a set of transmission occasions for CG-PUSCH messages via RRC signaling. With Type 1, the configured grant is activated via the RRC signaling which configures the transmission occasions. That is, the configured grant is active once the transmission occasions are configured. Moreover, RRC signaling may be used to deactivate the configured grant, where the transmission occasions of the configured grant are unusable once the configured grant is deactivated. In the context of Type 1 configured grants, all transmission parameters for the transmission occasions may be configured via RRC signaling. That is, RRC signaling which activates the configured grant/transmission occasions may indicate parameters associated with the transmission occasions, including a periodicity, an offset, a modulation and coding scheme (MCS), a K value, a PC, a demodulation reference signal (DMRS) configuration, or any combination thereof. RRC signaling used for Type 1 configured grants may include ConfiguredGrantConfig messages (common to Type 1 and Type 2), rrc-COnfiguredUplinkGrant messages (specific to Type 1), or both.

Comparatively, in the context of Type 2 uplink configured grants, the base station 105-a may configure a set of transmission occasions for CG-PUSCH messages via RRC signaling, and may subsequently activate the grant via subsequent control signaling (e.g., DCI signaling). In other words, Type 2 configured grants may be activated via DCI such that the grant/transmission occasions are activated once an "activation DCI message" is received. Activation DCI messages may include a cyclic redundancy check (CRC) portion which is scrambled with configured scheduling-radio network temporary identifier (CS-RNTI), with a new data indicator (NDI) field and/or a redundancy version (RV) field set to zero for validation (e.g., NDI=0, RV=0, or both). Type 2 configured grants may be deactivated once a "deactivation DCI message" is received. In the context of Type 2 configured grants, transmission parameters for the transmission occasions (e.g., periodicity, offset, MCS, K, PC, DMRS configuration) may be configured via the RRC signaling which configures the transmission occasions, via the activation DCI message, or both. That is, some parameters may be RRC-configured (e.g., via a ConfiguredGrantConfig message similar to Type 1), while other parameters are indicated via the DCI message which activates the transmission occasions.

In addition to the use of configured grants which schedule PUSCH messages within sets of configured transmission occasions, the wireless communications system 200 may additionally support dynamic scheduling (e.g., dynamic grants) which enable the base station 105-a to dynamically schedule the UE 115-a to transmit PUSCH messages via DCI messages that dynamically schedule a DG-PUSCH messages. As compared to configured grants, in which the resources for PUSCH messages are configured via RRC signaling, resources for DG-PUSCH messages may be dynamically indicated via the DCI message which schedules the respective DG-PUSCH. As such, a dynamic grant message (e.g., DG-PUSCH message) may refer to a message which is dynamically scheduled via control signaling from the network (e.g., via DCI 0_0, DCI 01) and which does not require explicit or implicit activation after scheduling. Moreover, as compared to configured grants which may schedule and activate sets of transmission occasions, a dynamic grant may schedule a single dynamically scheduled message (e.g., each DG-PUSCH message may be scheduled by a single DCI).

As noted previously herein, some wireless communications systems may not allow UEs 115 to transmit at least some types of PUSCH messages simultaneously. In particular, in some wireless communications systems, a UE 115 may not be able to transmit a CG-PUSCH if the CG-PUSCH overlaps in time with a DG-PUSCH in the same component carrier. Moreover, the inability to transmit the overlapping CG-PUSCH message may be conditioned on a timing of the CG-PUSCH message relative to the control signaling which schedules the DG-PUSCH message satisfying some time threshold (e.g., satisfying a timeline). In particular, the timeline may be satisfied as long as the CG-PUSCH message is scheduled some quantity of symbols (e.g., N2 symbols) following the DCI message which schedules the DG-PUSCH message, where the quantity of symbols is determined according to a processing capability of the UE 115. In other words, according to some conventional techniques, a UE 115 is not expected to be scheduled by a physical downlink control channel (PDCCH) message (e.g., DCI) ending in symbol i to transmit a PUSCH message on a given serving cell overlapping in time with a transmission occasion, where the UE 115 is allowed to transmit a PUSCH with configured grant starting in a symbol j on the same serving cell if the end of symbol i is not at least N2 symbols before the beginning of symbol j.

For example, referring to FIG. 2, in some wireless communications systems, a UE 115 may be scheduled to perform a first PUSCH message 220-a and a second PUSCH message 220-b in a same component carrier, where the first PUSCH message 220-a includes (as illustrated in FIG. 2) a DG-PUSCH message and the second PUSCH message 220-b includes (as illustrated in FIG. 2) a CG-PUSCH. In such cases, according to some conventional techniques, the UE 115 may be unable to transmit the second PUSCH message 220-b (e.g., CG-PUSCH) due to the CG-PUSCH message being scheduled within the same component carrier and overlapping in time with the DG-PUSCH message. The ability to drop the overlapping CG-PUSCH message (e.g., second PUSCH message 220-b) may be conditioned on a time interval 230 between a DCI message 225 which schedules the first PUSCH message 220-a and the second PUSCH message 220-b satisfying some threshold time interval (e.g., time interval 230≥N2 symbols).

According to some other techniques, a UE 115 may be able to transmit a CG-PUSCH message which overlaps with a DG-PUSCH message in cases where the UE 115 is configured with logical channel prioritization (e.g., lch-basedPrioritization). For example, according to some techniques, the UE 115-a may be scheduled to perform a DG-PUSCH message 220-a and a CG-PUSCH message 220-b in a same component carrier. In this example, if the UE 115-a is configured with logical channel prioritization, the UE 115-a may be configured to perform the PUSCH message with the higher priority, and drop the PUSCH message with the lower priority. That is, if the CG-PUSCH message 220-b has a higher priority, the UE 115-a may be configured to drop the DG-PUSCH message 220-a and transmit the CG-PUSCH message 220-b. In such cases, the timeline for the CG-PUSCH message 220-b should still be satisfied (e.g., time interval 230≥N2 symbols). In other words, the UE 115-a may be configured to drop the CG-PUSCH message 220-b and/or transmit the CG-PUSCH message 220-b based on a satisfaction of a threshold time interval/timeline, which may be determined based on processing capabilities of the UE 115-a.

The inability to transmit overlapping PUSCH messages 220 may lead to difficulties when scheduling uplink communications at the UE 115-a. Moreover, the inability to transmit overlapping PUSCH messages 220 may lead to an inefficient use of resources, as well as increased latency (e.g., dropped PUSCH messages 220) within the wireless communications system 200.

Accordingly, the UE 115-a and the base station 105-a of the wireless communications system 200 may support techniques which enable the UE 115-a to transmit multiple PUSCH messages 220 which overlap in time, including at least one CG-PUSCH message 220 (e.g., CG-PUSCH message 220-b). In particular, aspects of the present disclosure provide for transmission configurations which define different sets of rules which enable the UE 115-a to determine whether multiple overlapping PUSCH messages 220 including at least one CG-PUSCH message 220 may be simultaneously transmitted. By enabling the UE 115-a to transmit multiple overlapping PUSCH messages 220, aspects of the present disclosure may lead to more efficient scheduling of uplink communications at the UE 115-a, reduced latency, and improved use of communications resources within the wireless communications system 200.

For example, the UE 115-a may receive an indication of a transmission configuration 210 from the base station 105-a. The transmission configuration 210 may define a set of rules or conditions for performing temporally overlapping PUSCH messages. In this regard, the transmission configuration 210 may define a set of rules or conditions which the UE 115-a may use to determine whether or not it may transmit temporally overlapping PUSCH messages 220. Conditions for different transmission configurations 210 will be shown and described in further detail with respect to FIGS. 3 and 4.

The indication of the transmission configuration 210 may be indicated via any type of control signaling, including an RRC message, a DCI message, a MAC control element (MAC-CE) message, or any combination thereof. In some cases, the base station 105-a may explicitly indicate which transmission configuration 210 is to be used at the UE 115-a. In other cases, the base station 105-a may indicate a transmission configuration 210 from a set of transmission configurations 210 supported by the UE 115-a, where the set of transmission configurations 210 may be signaled by the base station 105-a (e.g., via RRC signaling), configured at the UE 115-a, or both. Additionally, or alternatively, the UE 115-a may be configured to use a default transmission configuration 210, or autonomously select from a set of supported transmission configurations 210.

The UE 115-a may receive first signaling 215-a that schedules a first PUSCH message 220-a from the UE 115-a to the base station 105-a. In some aspects, the base station 105-a may transmit the first signaling 215-a based on the transmission configuration 210 for temporally overlapping PUSCHs. The first PUSCH message 220-a may include a DG-PUSCH or a CG-PUSCH. For example, as shown in FIG. 2, the first PUSCH message 220-a may include a DG-PUSCH message 220-a which is scheduled via a DCI message 225. In this example, the DCI message 225 may include an example of the first signaling 215-a.

Additionally, the UE 115-a may receive second signaling 215-b that schedules a second PUSCH message 220-b from the UE 115-a to the base station 105-a. In some cases, the first signaling 215-a and the second signaling 215-b may include the same or different signaling. In some aspects, the base station 105-a may transmit the second signaling 215-b based on the transmission configuration 210 for temporally overlapping PUSCHs. Additionally, or alternatively, the base station 105-a may transmit the second signaling 215-b based on scheduling the first PUSCH message 220-a via the first signaling 215-a.

The second PUSCH message 220-b may include a DG-PUSCH or a CG-PUSCH. For example, as shown in FIG. 2, the second PUSCH message 220-b may include a CG-PUSCH message 220-b. The CG-PUSCH message 220-b may include a Type 1 configured grant which is scheduled via an RRC message and/or a Type 2 configured grant which is scheduled via both RRC signaling and an activation DCI message.

In some aspects, the first PUSCH message 220-a and the second PUSCH message 220-b may be scheduled to be performed within the same serving cell and/or the same component carrier. Moreover, the first and second PUSCH messages 220-b may at least partially overlap in the time domain. For example, as shown in FIG. 2, the second PUSCH message 220-b may at least partially overlap in the time domain with the first PUSCH message 220-a. In some cases, the first PUSCH message 220-a and the second PUSCH message 220-b may at least partially overlap in the frequency domain. In this regard, the first and second PUSCH messages 220-a, 220-b may fully or partially overlap in the time domain, the frequency domain, or both (e.g., fully overlapping in time and frequency, fully overlapping in time and non-overlapping in frequency, partially overlapping in time and non-overlapping in frequency, partially overlapping in both time and frequency).

Additionally, in some cases, the UE 115-*a* may receive third signaling 215-*c* (e.g., RRC message, DCI message, or both) that schedules a third PUSCH message 220-*c* from the UE 115-*a* to the base station 105-*a*. The third PUSCH message 220-*c* may include a DG-PUSCH or a CG-PUSCH. In some aspects, third PUSCH message 220-*c* may be scheduled within the same component carrier (or different component carrier) as the first PUSCH message 220-*a* and/or the second PUSCH message 220-*b*. Moreover, the third PUSCH message 220-*c* may at least partially overlap in time with the first PUSCH message 220-*a*, the second PUSCH message 220-*b*, or both. For example, as shown in FIG. 2, the third PUSCH message 220-*c* may partially overlap in the time domain with the first and second PUSCH messages 220-*a*, 220-*b*.

The base station 105-*a* may transmit the third signaling 215-*c* based on the transmission configuration 210 for temporally overlapping PUSCHs. Additionally, or alternatively, the base station 105-*a* may transmit the third signaling 215-*c* based on scheduling the first PUSCH message 220-*a* via the first signaling 215-*a*, scheduling the second PUSCH message 220-*b* via the second signaling 215-*b*, or both.

In accordance with some transmission configurations (e.g., transmission configuration 210), the UE 115-*a* may be able to transmit multiple temporally overlapping PUSCH messages if the respective PUSCH messages belong to different PUSCH groups (e.g., belong to different sets of PUSCH groups). In other words, in accordance with some transmission configurations 210, the UE 115-*a* may be unable to transmit temporally overlapping PUSCH messages 220 including at least one CG-PUSCH if the temporally overlapping PUSCH messages 220 belong to the same PUSCH group. In this regard, the UE 115-*a* may be configured to identify the PUSCH groups for the respective PUSCH messages 220 to determine whether or not the UE 115-*a* is able to transmit the respective PUSCH messages 220-*a*, 220-*b*, 220-*c*.

The PUSCH groups (e.g., sets of PUSCH messages) for each of the respective PUSCH messages 220 may be defined and/or determined according to one or more parameters or characteristics. For example, PUSCH groups may be defined or based on parameters including, but not limited to, CORESET pool indexes (e.g., CORESETPoolIndex), uplink beam groups (e.g., UE panel identifiers, TCI states, spatial relationships for uplink beam groups, sounding reference signal (SRS) resource set identifiers), uplink power control closed loop indexes, antenna ports (e.g., PUSCH antenna ports, SRS antenna ports, DMRS antenna ports), code division multiplexing (CDM) groups, timing advance group (TAG) identifiers, physical cell identifiers (PCIs), synchronization signal block (SSB) sets for the respective PUSCH messages 220, or any combination thereof.

In some aspects, the parameters used to determine the PUSCH groups for the respective PUSCH messages 220 may be indicated via the respective signaling 215 that schedules the respective PUSCH message 220. In this regard, parameters indicating PUSCH groups may be indicated to the UE 115-*a* via RRC signaling, DCI signaling (e.g., DCI message 225), other control signaling, or any combination thereof. For example, in cases where the first signaling 215-*a* includes a DCI message 225 that schedules a DG-PUSCH message 220-*a*, the parameters used to indicate the PUSCH group for the DG-PUSCH message 220-*a* may be indicated via the DCI message 225. By way of another example, in cases where the second signaling 215-*b* includes an RRC message, a DCI message, or both, that schedule a CG-PUSCH message 220-*b*, the parameters used to indicate the PUSCH group for the CG-PUSCH message 220-*b* may be indicated via the RRC message, the DCI message, or both.

For example, the UE 115-*a* may identify that the first and second PUSCH messages 220-*b* belong to different PUSCH groups (e.g., different sets of PUSCH messages) based on the first and second PUSCH messages 220-*a*, 220-*b* being associated with different CORESET pool indexes. In the case of a DG-PUSCH message 220 (e.g., DG-PUSCH message 220-*b*), the CORESETPoolIndex for the DG-PUSCH message 220-*a* may be determined based on the CORESET in which the DCI message 225 that schedules the DG-PUSCH message 220-*a* is received. Comparatively, the CORESETPoolIndex value for CG-PUSCH messages (e.g., CG-PUSCH message 220-*b*) may be configured in RRC or may be based on activation DCI signaling (for Type 2 CG) (e.g., based on the second signaling 215-*b* which schedules the CG-PUSCH message 220-*b*).

In some implementations, CORESETPoolIndex values may be introduced for multi-DCI based multi-transmission-reception point (TRP) communications. Each CORESET-PoolIndex may have a value of 0 or 1 (e.g., CORESET-PoolIndex=0, CORESETPoolIndex=1, where each CORESET is associated with one of the two respective CORESETPoolIndex values, which effectively divides PUSCH messages 220 (e.g., PUSCH messages 220-*a*, 220-*b*, 220-*c*) and their corresponding CORESETs in to two groups. Stated differently, the CORESETPoolIndex for each respective PUSCH message 220 may serve as a TRP identifier.

By way of another example, the UE 115-*a* may identify PUSCH groups (e.g., sets of PUSCH messages) for the respective PUSCH messages 220 based on uplink beam groups associated with the respective PUSCH messages 220. In such cases, the uplink beam groups for each respective PUSCH message 220 may be determined based on UE panel identifiers, uplink TCIs, SRS resource set identifiers for the respective PUSCH messages 220, or any combination thereof. Different uplink beam groups may be associated with different PUSCH groups.

By way of another example, the UE 115-*a* may identify PUSCH groups (e.g., sets of PUSCH messages) for the respective PUSCH messages 220 based on uplink power control closed loop indexes, where different uplink power control closed loop indexes may be associated with different PUSCH groups. The wireless communications system 200 may support two closed loop indices (e.g., 0 and 1) for two closed loop power controls for different PUSCH messages 220 in the same component carrier. For instance, the UE 115-*a* may identify that the first PUSCH message 220-*a* is associated with a first uplink power control closed loop index of 0, and that the second PUSCH message 220-*b* is associated with a first uplink power control closed loop index of 1, and may identify different PUSCH groups based on the differing uplink power control closed loop indices.

In other cases, the UE 115-*a* may identify PUSCH groups (e.g., sets of PUSCH messages) for the respective PUSCH messages 220 based on antenna ports (e.g., PUSCH antenna ports, SRS antenna ports, DMRS antenna ports) and/or CDM groups associated with the respective DMRS ports, where different antenna ports and/or CDM groups are associated with different PUSCH groups. The respective antenna ports may be indicated via different fields within the signaling 215 that schedules the respective PUSCH messages 220. For example, PUSCH and SRS antenna ports may be indicated within SRS resource indicator (SRI) fields in uplink DCI messages (e.g., DCI message 225), whereas DMRS antenna ports may be indicated via an "antenna port(s) field" in uplink DCI messages.

In other cases, the UE 115-*a* may identify PUSCH groups (e.g., sets of PUSCH messages) for the respective PUSCH messages 220 based on TAG identifiers, PCIs, SSB sets, or any combination thereof, which correspond to the respective PUSCH messages 220. For example, different PUSCH groups may have differing time advances for uplink transmission, such that differing TAG identifiers may indicate different PUSCH groups. By way of another example, the UE 115-*b* may determine PUSCH groups for the respective PUSCH messages 220 based on serving cell vs non-serving cell PCI/SSB sets for inter-cell multi-TRP communications.

While FIG. 2 illustrates a UE 115-*b* determining PUSCH groups for a DG-PUSCH message 220-*a* and a CG-PUSCH message 220-*b*, this concept may also be applied to multiple overlapping CG-PUSCH messages. in other words, in accordance with some transmission configurations 210, the UE 115-*b* may be able to transmit multiple temporally overlapping CG-PUSCH messages 220 which belong to different PUSCH groups, but may be unable to transmit multiple temporally overlapping CG-PUSCH messages 220 which belong to the same PUSCH group.

In accordance with additional or alternative transmission configurations (e.g., transmission configuration 210), the UE 115-*a* may be able to transmit multiple temporally overlapping PUSCH messages based on relative priorities (e.g., logical channel priorities) associated with the respective PUSCH messages 220. In this regard, in some cases, the UE 115-*a* may identify a priority (e.g., logical channel priority) associated with the respective PUSCH messages 220 in accordance with the transmission configuration 210. More specifically, the UE 115-*a* may be configured to identify the priorities of the respective PUSCH messages in cases where the UE 115-*a* is configured and/or activated with logical channel based prioritization (e.g., lch-basedPrioritization).

In some cases, the UE 115-*a* may be configured, activated, or otherwise enabled with logical channel based prioritization (e.g., lch-basedPrioritization) across all communications performed at the UE 115-*a* (e.g., lch-basedPrioritization enabled for all PUSCH groups). In other cases, logical channel based prioritization be configured, activated, or otherwise enabled on a PUSCH group basis. In other words, logical channel based prioritization may be configured for a first PUSCH group (e.g., first set of PUSCH messages), but not for a second PUSCH group (e.g., second set of PUSCH messages). In this regard, the UE 115-*a* may be configured to identify logical channel priorities for the respective PUSCH messages 220 based on identifying the PUSCH groups for the respective PUSCH messages 220. In particular, the UE 115-*a* may be configured to identify logical channel priorities only for PUSCH messages 220 which are associated with a PUSCH group in which logical channel based prioritization is activated/configured.

In some aspects, the UE 115-*a* may refrain from transmitting the third PUSCH message 220-*c* (e.g., drop the third PUSCH message 220-*c*) based on the third PUSCH message 220-*c* being scheduled in the same component carrier as the first and second PUSCH messages 220-*a*, 220-*b* and/or based on the third PUSCH message 220-*c* overlapping in time with both the first and second PUSCH messages 220-*a*, 220-*b*. Moreover, the UE 115-*a* may be configured to drop the third PUSCH message 220-*c* in accordance with the transmission configuration 210 (e.g., based on a satisfaction, or lack thereof, of one or more conditions associated with the transmission configuration 210).

In this regard, the UE 115-*a* may be configured to drop the third PUSCH message 220-*c* based on receiving the transmission configuration 210, receiving the first signaling 215-*a*, receiving the second signaling 215-*b*, receiving the third signaling 215-*c*, identifying the PUSCH groups and/or logical channel priorities of the respective PUSCH messages 220, or any combination thereof. As such, the UE 115-*a* may be configured to drop the third PUSCH message 220-*c* based on a comparison of the PUSCH groups of the respective PUSCH messages 220, a comparison of the priorities of the respective PUSCH messages 220, the types of PUSCH messages 220 (e.g., DG-PUSCH, CG-PUSCH), or any combination thereof.

For example, in accordance with some transmission configurations 210, the UE 115-*a* may be unable to transmit temporally overlapping PUSCH messages 220 which belong to the same PUSCH group (e.g., belong to the same set of PUSCH messages). In this regard, the UE 115-*a* may drop the third PUSCH message 220-*c* based on the third PUSCH message 220-*c* belonging to the same PUSCH group as the first and/or second PUSCH message 220-*a*, 220-*b*.

Moreover, in accordance with other transmission configurations 210, the UE 115-*a* may be configured to choose between temporally overlapping PUSCH messages 220 within the same PUSCH group. In this regard, the UE 115-*a* may be configured to drop the third PUSCH message 220-*c* based on the third PUSCH message 220-*c* belonging to the same PUSCH group as the first and/or second PUSCH message 220-*a*, 220-*b* and being associated with a lower logical channel priority as the respective first/second PUSCH message 220-*a*, 220-*b*.

In cases where the third PUSCH message 220-*c* includes a CG-PUSCH message 220-*c*, the UE 115-*a* may be configured to drop the third PUSCH message 220-*c* based on a timeline between the third PUSCH message 220-*c* and DCI message(s) scheduling the first/second PUSCH messages 220-*a*, 220-*b* being satisfied. For example, as described previously herein, the UE 115-*a* may drop the third PUSCH message 220-*c* (e.g., CG-PUSCH message 220-*c*) if a time interval between a the third PUSCH message 220-*c* and the DCI message 225 scheduling the first PUSCH message 220-*a* satisfies (e.g., is greater than or equal to) a threshold time interval (e.g., ≥N2 slots).

The UE 115-*a* may transmit the first PUSCH message 220-*a* and the second PUSCH messages 220-*b* to the base station 105-*a*. As noted previously herein, the first and second PUSCH messages 220-*a*, 220-*b* may be transmitted in the same component carrier, and may at least partially overlap in time. In some aspects, the UE 115-*a* may be configured to transmit the first and second PUSCH messages 220-*a*, 220-*b* in accordance with the transmission configuration 210. In particular, transmission configuration 210 may be associated with one or more criteria for transmitting temporally overlapping PUSCH messages, and the UE 115-*a* may transmit the first PUSCH message 220-*a* and the second PUSCH message 220-*b* based on one or more criteria being satisfied. Criteria for different transmission configurations 210 will be shown and described in further detail with respect to FIGS. 3 and 4.

For example, in accordance with some transmission configurations 210, the UE 115-*a* may transmit the first and second PUSCH messages 220-*a*, 220-*b* based on the first and second PUSCH messages 220-*b* belonging to different PUSCH groups (e.g., belonging to different sets of PUSCH messages). In accordance with additional or alternative transmission configurations 210, the UE 115-a may transmit the first and second PUSCH messages 220-a, 220-b based on a comparison of logical channel priorities associated with the first, second, and third PUSCH message 220. For example, the UE 115-a may transmit the first and second PUSCH messages 220-a, 220-b based on the first PUSCH message 220-a, the second PUSCH message 220-b, or both, being associated with a higher logical channel priority as compared to the third PUSCH message 220-c.

In this regard, in accordance with some transmission configurations 210 and in cases with three or more PUSCH messages (such as shown in FIG. 2), overlapping conflicts may be resolved within a same group (e.g., conflict resolution is a function of priority of the PUSCH, and whether it is CG or DG), and then the surviving PUSCHs which are associated with different groups and can be transmitted simultaneously.

Techniques described herein may facilitate more efficient use of resources by enabling the UE 115-a to transmit PUSCH messages which at least partially overlap in time. In particular, techniques described herein may enable the UE 115-a to transmit CG-PUSCHs which at least partially overlap in the time domain with other PUSCHs, such as another CG-PUSCH or a DG-PUSCH. Accordingly, techniques described herein may enable more efficient scheduling of uplink communications at the UE 115-a, reduce latency, and lead to a more efficient use of resources within the wireless communications system 200.

Figure 3:
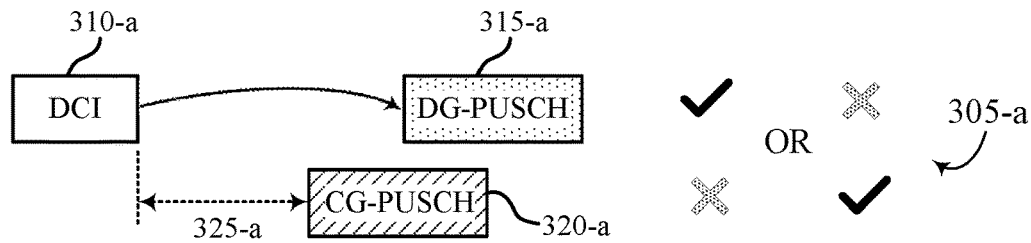
FIG. 3 illustrates an example of a resource configuration that supports techniques for performing overlapping configured grant and dynamic grant PUSCH transmissions in accordance with aspects of the present disclosure.
Figure 3:
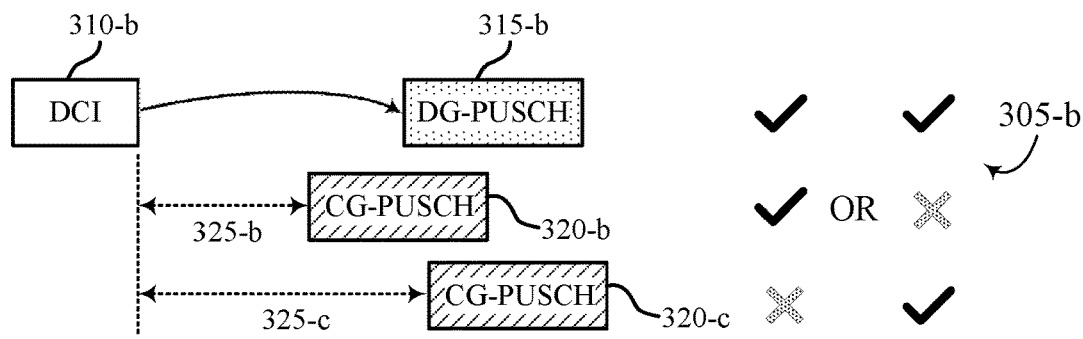
Figure 3:
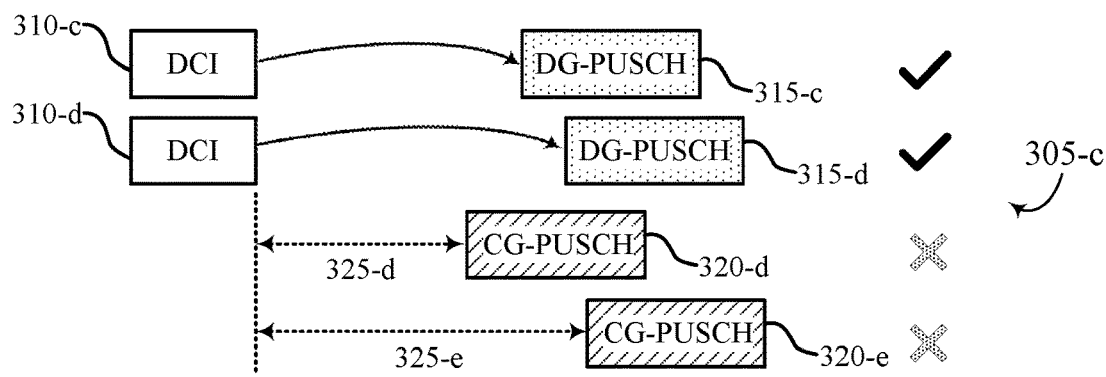

FIG. 3 illustrates an example of a resource configuration 300 that supports techniques for performing overlapping configured grant and dynamic grant PUSCH transmissions in accordance with aspects of the present disclosure. In some examples, the resource configuration 300 may implement, or be implemented by, aspects of wireless communications system 100, wireless communications system 200, or both.

The resource configuration 300 illustrates different transmission configurations 305 for transmitting temporally overlapping PUSCH messages. In particular, the respective transmission configurations 305 illustrate different examples and conditions/criteria which associated with transmission configurations at the UE 115 which may be used to determine whether or not temporally overlapping PUSCH messages may be transmitted.

As shown in the first transmission configuration 305-a, a UE 115 may be scheduled to perform a DG-PUSCH message 315-a and a CG-PUSCH message 320-a. In some cases, the DG-PUSCH message 315-a may be scheduled via a DCI message 310-a (e.g., first signaling), whereas the CG-PUSCH message 320-a may be scheduled via an RRC message in the context of a Type 1 configured grant, or via a combination of an RRC message and an activation DCI message in the context of a Type 2 configured grant. As shown in FIG. 3, the DG-PUSCH message 315-a and the CG-PUSCH message 320-a may at least partially overlap in time, and may be scheduled within the same component carrier.

In this example, both the DG-PUSCH message 315-a and the CG-PUSCH message 320-a may belong to the same PUSCH group (e.g., belong to the same set of PUSCH messages). As noted previously herein, PUSCH groups may be determined based on any number of parameters, including CORESET pool indices, uplink beam groups, uplink power control closed loop indices, antenna ports, and the like. In accordance with some transmission configurations (e.g., transmission configuration 305-a), the UE 115 may be unable to transmit temporally overlapping PUSCH messages which belong to the same PUSCH group. As such, in accordance with the transmission configuration 305-a, the UE 115 may be configured to drop one of the DG-PUSCH message 315-a or the CG-PUSCH message 320-a in cases where the PUSCH messages 315-a, 320-b belong to the same PUSCH group.

In particular, the UE 115 may not be expected to be scheduled by a PDCCH message ending in symbol i to transmit a PUSCH message on a given serving cell overlapping in time with a transmission occasion, where the UE 115 is allowed to transmit a PUSCH message with configured grant starting in a symbol j on the same serving cell if the end of symbol i is not at least N2 symbols before the beginning of symbol j, if the PUSCH and the PUSCH with configured grant belong to the same group.

In other words, if the DG-PUSCH message 315-a and the CG-PUSCH message 320-a belong to the same PUSCH group (e.g., same set of PUSCH messages), the UE 115 may be configured to drop one of the PUSCH messages. In cases where the UE 115 is not configured with logical channel based prioritization (e.g., lch-basedPrioritization), or in cases where the PUSCH group associated with the PUSCH messages 315-a, 320-a is not enabled with logical channel based prioritization, the UE 115 may be configured to drop the CG-PUSCH message 320-a. Comparatively, in cases where the UE 115 and the respective PUSCH group is configured with logical channel based prioritization, the PUSCH message with the lower priority may be dropped. However, in some cases where logical channel based prioritization is enabled and the DG-PUSCH message 315-a and the CG-PUSCH message 320-a have the same priority (and where the DG-PUSCH message 315-a has the higher priority), the UE 115 may be configured to drop the CG-PUSCH message 320-a.

As noted previously herein, the UE 115 may be configured, activated, or otherwise enabled with logical channel based prioritization (e.g., lch-basedPrioritization) across all communications performed at the UE 115 (e.g., lch-basedPrioritization enabled for all PUSCH groups). In other cases, logical channel based prioritization be configured, activated, or otherwise enabled on a PUSCH group basis. In other words, logical channel based prioritization may be configured for a first PUSCH group (e.g., first set of PUSCH messages), but not for a second PUSCH group (e.g., second set of PUSCH messages).

In cases where the CG-PUSCH message 320-a is dropped, the dropped CG-PUSCH message 320-a should satisfy the timeline with respect to the DCI message 310-a that schedules the overlapping DG-PUSCH message 315-a. In other words, in cases where the UE 115 selects to drop the CG-PUSCH message 320-a, the UE 115 may drop the CG-PUSCH message 320-a based on a time interval 325-a between the dropped CG-PUSCH message 320-a and the DCI message 310-a satisfying some time threshold (e.g., based on time interval 325-a≥N2 symbols).

In accordance with additional or alternative transmission configurations for temporally overlapping PUSCH messages, conflicts between PUSCH messages may be resolved irrespective of group (or even without identifying corresponding PUSCH groups). In particular, in some transmission configurations, conflicts between overlapping PUSCH messages may be resolved based on priority and/or whether each PUSCH message is a DG-PUSCH or CG-PUSCH until two surviving, overlapping PUSCHs among all overlapping PUSCHs are identified and transmitted.

For example, reference will now be made to the second transmission configuration 305-b. As shown in the second transmission configuration 305-b, a UE 115 may be scheduled to perform a DG-PUSCH message 315-b, a first CG-PUSCH message 320-b, and a second CG-PUSCH message 320-c. In some cases, the DG-PUSCH message 315-b may be scheduled via a DCI message 310-b (e.g., first signaling), whereas the CG-PUSCH messages 320-b, 320-c may be scheduled via RRC messages in the context of Type 1 configured grants, or via a combination of RRC messages and activation DCI messages in the context of Type 2 configured grants. As shown in FIG. 3, the DG-PUSCH message 315-b and the CG-PUSCH messages 320-b, 320-c may at least partially overlap in time, and may be scheduled within the same component carrier.

In accordance with the second transmission configuration 305-b, and in cases where the UE 115 is not configured with logical channel prioritization, the UE 115 may be configured to select one CG-PUSCH message 320 to transmit among all the CG-PUSCH messages 320 that overlap with the DG-PUSCH message 315-b, and may then transmit the selected CG-PUSCH message 320 and the DG-PUSCH message 315-b. For example, the UE 115 may select the first overlapping CG-PUSCH message 320-b, and may transmit the DG-PUSCH message 315-b and the first CG-PUSCH message 320-b. By way of another example, the UE 115 may select the second overlapping CG-PUSCH message 320-c, and may transmit the DG-PUSCH message 315-b and the second CG-PUSCH message 320-c.

When selecting between overlapping CG-PUSCH messages 320, the UE 115 may utilize one or more parameters based on the second transmission configuration 305-b. Parameters/characteristics which may be used to select between the overlapping PUSCH messages 320-b, 320-c may include, but are not limited to, a configured grant index, a periodicity, an initial transmit time, a duration, a quantity of resource blocks, an extent of temporal and/or frequency overlap with the DG-PUSCH message 315-b, a DMRS symbol location, a CDM group, or any combination thereof. For example, in some cases, the UE 115 may select the CG-PUSCH message 320 with the lower configured grant index, the CG-PUSCH message 320 with the shortest periodicity, the CG-PUSCH message 320 that starts earlier (e.g., earlier initial transmit time), the CG-PUSCH message 320 that has longest duration and/or more resource blocks, or any combination thereof. In other cases, the UE 115 may select the CG-PUSCH message 320 that fully overlaps in time with the DG-PUSCH message 315-b, the CG-PUSCH message 220 that does not overlap in frequency with the DG-PUSCH message 315-b, the CG-PUSCH message 320 with same DMRS symbol location as the DG-PUSCH message 315-b, the CG-PUSCH message 320 with a different DMRS CDM group compared to the DG-PUSCH message 315-b, or any combination thereof.

In some aspects, each transmitted and dropped/canceled CG-PUSCH message 320 should satisfy the timeline with respect to the DCI message 310-b that schedules the overlapping DG-PUSCH message 315-b. For example, in cases where the UE 115 selects to transmit the first CG-PUSCH message 320-b and drop the second CG-PUSCH message 320-c, the time intervals 325-b and 325-b between the respective CG-PUSCH messages 320-b, 320-c and the DCI message 310-b may each satisfy a time threshold. In other words, the UE 115 may transmit the first CG-PUSCH message 320-b based on a time interval 325-b between the first CG-PUSCH message 320-b and the DCI message 310-b satisfying a time threshold (e.g., based on time interval 325-b≥N2 symbols), and may drop the second CG-PUSCH message 320-c based on a time interval 325-c between the second CG-PUSCH message 320-c and the DCI message 310-b satisfying a time threshold (e.g., based on time interval 325-c≥N2 symbols).

As shown in the second transmission configuration 305-b, the UE 115 may select between overlapping CG-PUSCH messages 320 when the CG-PUSCH messages 320 overlap with a single DG-PUSCH message 315-b. However, in accordance with some transmission configurations, the UE 115 may be configured to drop all CG-PUSCH messages 320 which overlap with two or more overlapping DG-PUSCH messages 315.

For example, referring now to the third transmission configuration 305-c, a UE 115 may be scheduled to perform a first DG-PUSCH message 315-c, a second DG-PUSCH message 315-d, a first CG-PUSCH message 320-d, and a second CG-PUSCH message 320-e. In some cases, the DG-PUSCH messages 315-c and 315-d may be scheduled via DCI messages 310-c and 310-d, respectively, whereas the CG-PUSCH messages 320-b, 320-c may be scheduled via RRC messages, DCI messages, or both. As shown in FIG. 3, the DG-PUSCH messages 315-c and 315-d may at least partially overlap in time. Moreover, the CG-PUSCH messages 320-d, 320-e may at least partially overlap in time with each other, the first DG-PUSCH message 315-c, and the second DG-PUSCH message 315-d. Further, in some cases, each of the DG-PUSCH messages 315-c, 315-d and the CG-PUSCH messages 320-d, 320-e may be scheduled within the same component carrier.

In accordance with the third transmission configuration 305-c, the UE 115 may be configured to drop (e.g., cancel, refrain from transmitting) all CG-PUSCH messages 320 which overlap with a DG-PUSCH message 315 with another DG-PUSCH message 315. In this regard, as shown in FIG. 3, the UE 115 may be configured to drop both the CG-PUSCH messages 320-d, 320-e based on the CG-PUSCH messages 320-d, 320-e at least partially overlapping in time with at least one of the overlapping DG-PUSCH messages 315-c, 315-d. As such, the UE 115 may be configured to drop both CG-PUSCH messages 320, and transmit both DG-PUSCH messages 315 in accordance with the third transmission configuration 305-c.

Once again, the UE 115 may be configured to drop each CG-PUSCH message 320 based on a timeline with respect to the DCI message 310-c and/or 310-d being satisfied. In other words, the UE 115 may drop the first CG-PUSCH message 320-d based on a time interval 325-d between the first CG-PUSCH message 320-d and the first DCI message 310-c and/or second DCI message 310-d satisfying a time threshold (e.g., based on time interval 325-d≥N2 symbols), and may drop the second CG-PUSCH message 320-e based on a time interval 325-e between the second CG-PUSCH message 320-e and the first DCI message 310-c and/or second DCI message 310-d satisfying a time threshold (e.g., based on time interval 325-e≥N2 symbols).

Figure 4:
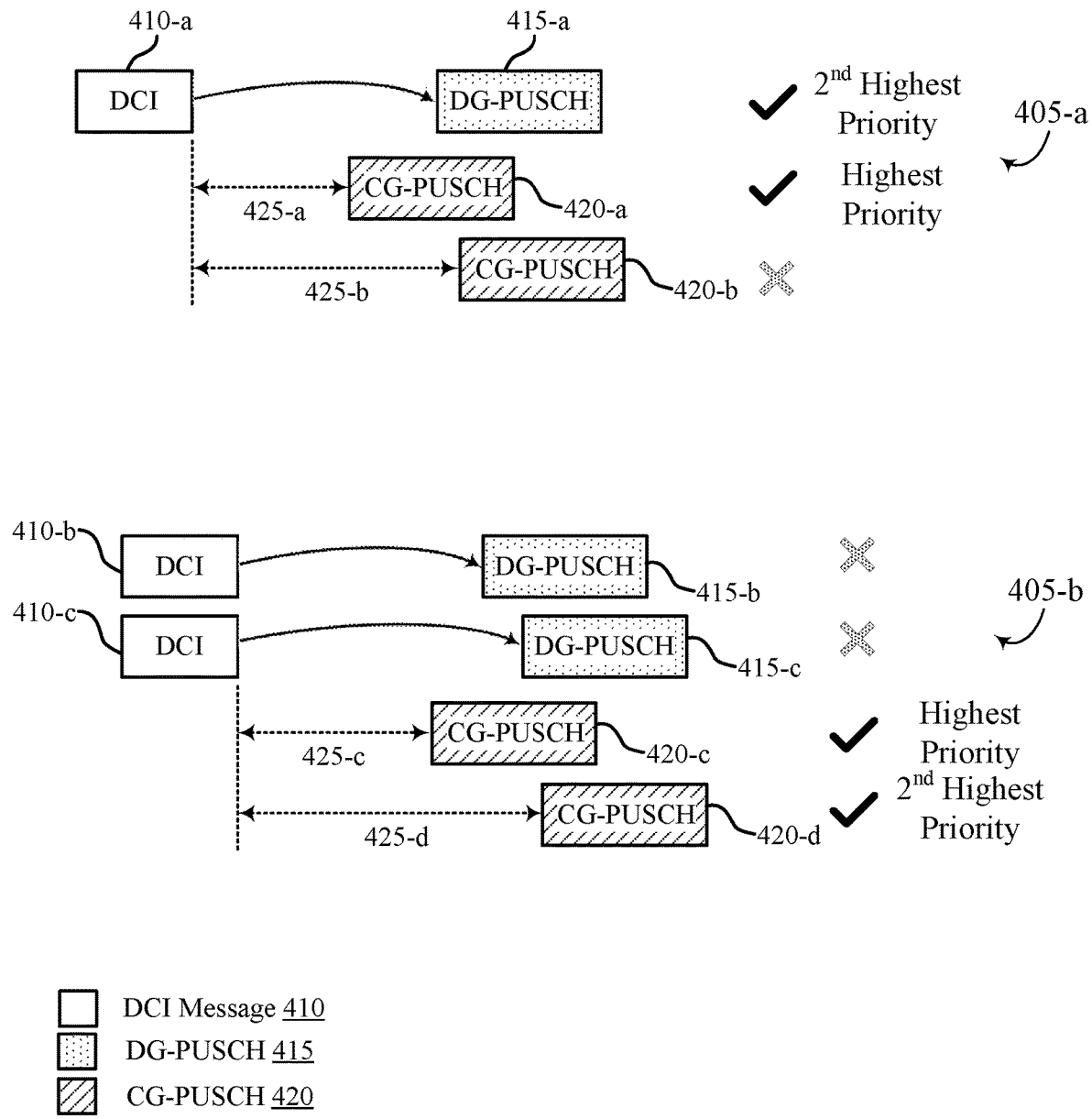
FIG. 4 illustrates an example of a resource configuration that supports techniques for performing overlapping configured grant and dynamic grant PUSCH transmissions in accordance with aspects of the present disclosure.

FIG. 4 illustrates an example of a resource configuration 400 that supports techniques for performing overlapping configured grant and dynamic grant PUSCH transmissions in accordance with aspects of the present disclosure. In some examples, the resource configuration 400 may implement, or be implemented by, aspects of wireless communications system 100, wireless communications system 200, resource configuration 300, or any combination thereof.

The resource configuration 400 illustrates different transmission configurations 405 for transmitting temporally overlapping PUSCH messages. In particular, the respective transmission configurations 405 illustrate different examples and conditions/criteria which associated with transmission configurations at the UE 115 which may be used to determine whether or not temporally overlapping PUSCH messages may be transmitted.

As shown in the first transmission configuration 405-*a*, a UE 115 may be scheduled to perform a DG-PUSCH message 415-*a*, a first CG-PUSCH message 420-*a*, and a second CG-PUSCH message 420-*b*. In some cases, the DG-PUSCH message 415-*a* may be scheduled via a DCI message 410-*a* (e.g., first signaling), whereas the CG-PUSCH messages 420-*a*, 420-*b* may be scheduled via RRC signaling, activation DCI signaling, or both. As shown in FIG. 4, the DG-PUSCH message 415-*a* and the CG-PUSCH messages 420-*a*, 420-*b* may at least partially overlap in time, and may be scheduled within the same component carrier.

In cases where the UE 115 is configured with logical channel prioritization (e.g., lch-basedPrioritization), and accordance with the first transmission configuration 405-*a*, the UE 115 may select to transmit the two PUSCH messages with the highest priority (e.g., highest logical channel priorities) for transmission, and may drop the PUSCH message with the lowest priority. In other words, the UE 115 may select the CG-PUSCH(s) and/or the DG-PUSCH with the highest priority among all overlapping PUSCHs in the component carrier for transmission. The selected PUSCH messages may have the same priority or different priorities, but any dropped PUSCH messages as a result of temporal overlap with the DG-PUSCH message 415-*a* and/or the CG-PUSCH messages 420-*a*, 420-*b* should not have higher priority than a PUSCH message which is transmitted.

For instance, as shown in the first transmission configuration 405-*a*, the UE 115 may identify that the first CG-PUSCH message 420-*a* has a highest priority, the DG-PUSCH message 415-*b* has the second highest priority, and the second CG-PUSCH message 420-*b* has the lowest priority. As such, in accordance with the first transmission configuration 405-*a*, the UE 115 may transmit the first CG-PUSCH message 420-*a* and the DG-PUSCH message 415-*a*, and may drop the second CG-PUSCH message 420-*b*.

In some aspects, each transmitted and dropped/canceled CG-PUSCH message 420 should satisfy the timeline with respect to the DCI message 410-*a* that schedules the overlapping DG-PUSCH message 415-*a*. For example, in cases where the UE 115 selects to transmit the first CG-PUSCH message 420-*a* and drop the second CG-PUSCH message 420-*b*, the time intervals 425-*a* and 425-*b* between the respective CG-PUSCH messages 420-*a*, 420-*b* and the DCI message 410-*a* may each satisfy a time threshold. In other words, the UE 115 may transmit the first CG-PUSCH message 420-*a* based on a time interval 425-*a* between the first CG-PUSCH message 420-*a* and the DCI message 410-*a* satisfying a time threshold (e.g., based on time interval 425-*a*≥N2 symbols), and may drop the second CG-PUSCH message 420-*b* based on a time interval 425-*b* between the second CG-PUSCH message 420-*b* and the DCI message 410-*a* satisfying a time threshold (e.g., based on time interval 425-*b*≥N2 symbols).

In cases where the UE 115 is configured with logical channel based prioritization, if two CG-PUSCH messages 420 have the highest priorities among overlapping PUSCHs messages, the UE 115 may transmit the overlapping CG-PUSCH messages 420 even if the overlapping CG-PUSCH messages 420 overlap in time with one or more DG-PUSCH messages 415.

For example, as shown in the second transmission configuration 405-*b*, a UE 115 may be scheduled to perform a first DG-PUSCH message 415-*b*, a second DG-PUSCH message 415-*c*, a first CG-PUSCH message 420-*c*, and a second CG-PUSCH message 420-*d*. In some cases, the DG-PUSCH messages 415-*b* and 415-*c* may be scheduled via DCI messages 410-*b* and 410-*c*, respectively, whereas the CG-PUSCH messages 420-*c*, 420-*d* may be scheduled via RRC messages, DCI messages, or both. As shown in FIG. 4, the DG-PUSCH messages 415-*b* and 415-*c* may at least partially overlap in time. Moreover, the CG-PUSCH messages 420-*c*, 420-*d* may at least partially overlap in time with each other, the first DG-PUSCH message 415-*b*, and the second DG-PUSCH message 415-*c*. Further, in some cases, each of the DG-PUSCH messages 415-*b*, 415-*c* and the CG-PUSCH messages 420-*c*, 420-*d* may be scheduled within the same component carrier.

In accordance with the second transmission configuration 405-*b*, the UE 115 may identify that the first CG-PUSCH message 420-*c* has a highest priority, and the second CG-PUSCH message 420-*d* has the second highest priority, where the DG-PUSCH messages 415-*b*, 415-*c* have the lowest priorities. In this example, the UE 115 may transmit the CG-PUSCH messages 420-*c*, 420-*d* based on the priorities despite the CG-PUSCH messages 420-*c*, 420-*d* overlapping in time with multiple temporally overlapping DG-PUSCH messages 415-*b*, 415-*c*. This may be contrasted with the third transmission configuration 305-*c* illustrated in FIG. 3, in which case logical channel prioritization is not enabled and the CG-PUSCH messages 320-*d*, 320-*e* are dropped based on the CG-PUSCH messages 320-*d*, 320-*e* overlapping in time with the multiple overlapping DG-PUSCH messages 315-*c*, 315-*d*. In other words, in cases where logical channel prioritization is not enabled (e.g., third transmission configuration 305-*c*), a DG-PUSCH message 315 may not be dropped in favor of a CG-PUSCH message 320 in cases where there are multiple overlapping DG-PUSCH messages 315.

Once again, referring to the second transmission configuration 405-*b* illustrated in FIG. 4, the UE 115 may be configured to transmit each CG-PUSCH message 420 based on a timeline with respect to the DCI message 410-*b* and/or 410-*c* being satisfied. In other words, the UE 115 may transmit the first CG-PUSCH message 420-*c* based on a time interval 425-*c* between the first CG-PUSCH message 420-*c* and the first DCI message 410-*b* and/or second DCI message 410-*c* satisfying a time threshold (e.g., based on time interval 425-*c*≥N2 symbols), and may transmit the second CG-PUSCH message 420-*d* based on a time interval 425-*d* between the second CG-PUSCH message 420-*d* and the first DCI message 410-*b* and/or second DCI message 410-*c* satisfying a time threshold (e.g., based on time interval 425-*d*≥N2 symbols).

Figure 5:
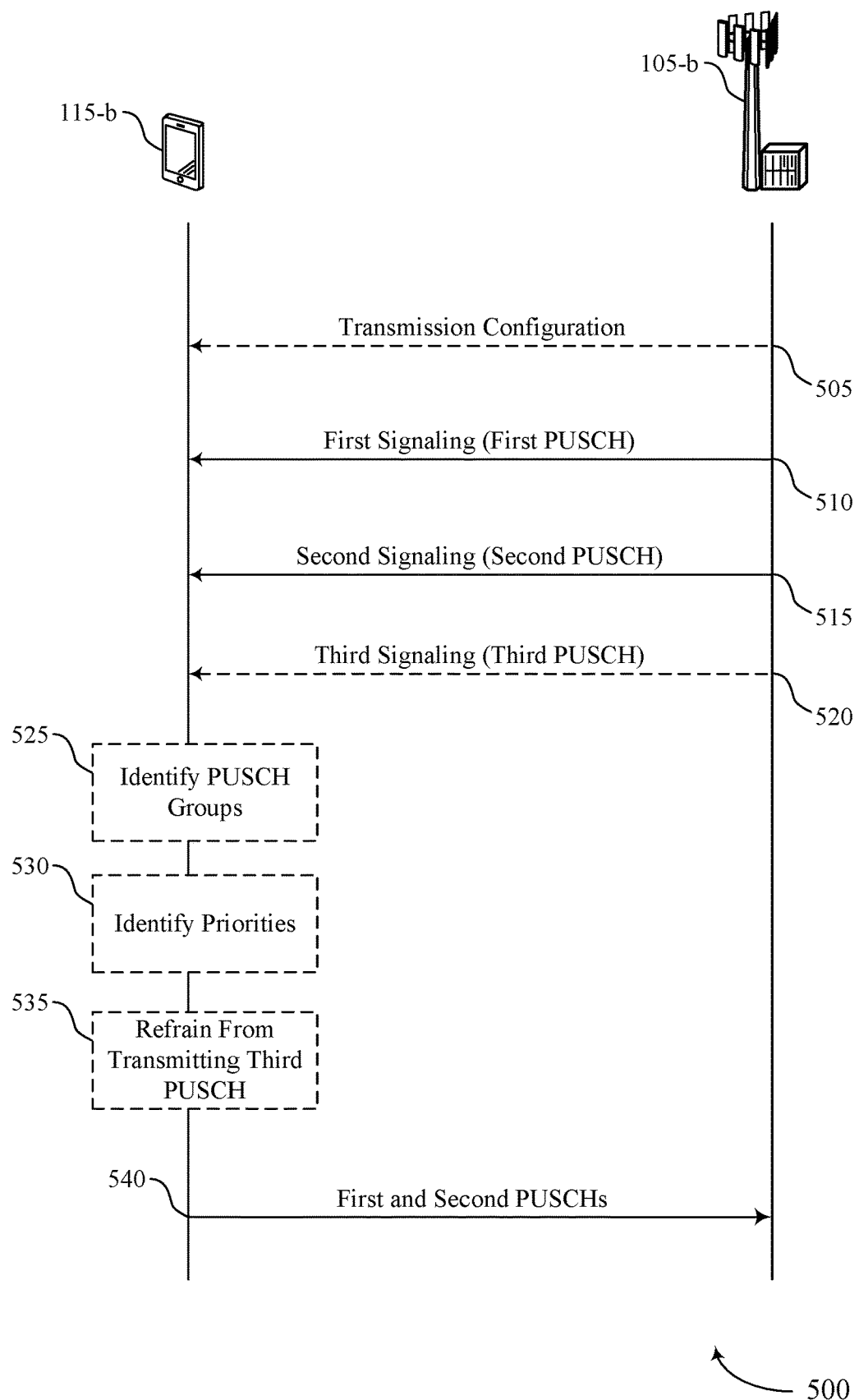
FIG. 5 illustrates an example of a process flow that supports techniques for performing overlapping configured grant and dynamic grant PUSCH transmissions in accordance with aspects of the present disclosure.

FIG. 5 illustrates an example of a process flow 500 that supports techniques for performing overlapping configured grant and dynamic grant PUSCH transmissions in accordance with aspects of the present disclosure. In some examples, process flow 500 may implement, or be implemented by, aspects of wireless communications system 100, wireless communications system 200, resource configuration 300, resource configuration 400, or any combination thereof. For example, the process flow 500 may illustrate a UE 115-*b* receiving signaling (e.g., RRC signaling, DCI signaling) which schedule temporally overlapping PUSCH messages including at least one CG-PUSCH, and transmitting the overlapping PUSCH messages in accordance with a transmission configuration for performance of temporally overlapping PUSCH messages, as described with reference to FIGS. 1-4.

In some cases, process flow 500 may include a UE 115-*b* and a base station 105-*b*, which may be examples of corresponding devices as described herein. For example, the UE 115-*b* and the base station 105-*b* illustrated in FIG. 5 may include examples of the UE 115-*a* and the base station 105-*a*, respectively, as illustrated in FIG. 2.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 505, the UE 115-*b* may receive an indication of a transmission configuration from the base station 105-*b*. The transmission configuration may define a set of rules or conditions for performing temporally overlapping PUSCH messages. In this regard, the transmission configuration may define a set of rules or conditions which the UE 115-*b* may use to determine whether or not it may transmit temporally overlapping PUSCH messages.

The indication of the transmission configuration may be indicated via any type of control signaling, including an RRC message, a DCI message, a MAC-CE message, or any combination thereof. In some cases, the base station 105-*b* may explicitly indicate which transmission configuration is to be used at the UE 115-*b*. In other cases, the base station 105-*b* may indicate a transmission configuration from a set of transmission configurations supported by the UE 115-*b*, where the set of transmission configurations may be signaled by the base station 105-*b* (e.g., via RRC signaling), configured at the UE 115-*b*, or both.

At 510, the UE 115-*b* may receive first signaling that schedules a first PUSCH message from the UE 115-*b* to the base station 105-*b*. The first PUSCH message may include a DG-PUSCH or a CG-PUSCH. In some aspects, the base station 105-*b* may transmit the first signaling based on the transmission configuration for temporally overlapping PUSCHs which was indicated at 505.

At 515, the UE 115-*b* may receive second signaling that schedules a second PUSCH message from the UE 115-*b* to the base station 105-*b*. The second PUSCH message may include a DG-PUSCH or a CG-PUSCH. In some aspects, the base station 105-*b* may transmit the second signaling based on the transmission configuration for temporally overlapping PUSCHs which was indicated at 505. Additionally, or alternatively, the base station 105-*b* may transmit the second signaling based on scheduling the first PUSCH message via the first signaling at 510.

In some aspects, the first PUSCH message and the second PUSCH message may be scheduled to be performed within the same component carrier. Moreover, the first and second PUSCH messages may at least partially overlap in the time domain. In some aspects, at least one of the first PUSCH message and the second PUSCH message may include a CG-PUSCH message. Moreover, the type of signaling (e.g., control signaling) used at 510 and 515 to schedule the respective PUSCH messages may be based on the type of PUSCH message being scheduled. For example, in some cases, the first signaling at 510 may include a DCI message which schedules a DG-PUSCH, and the second signaling at 515 may include an RRC message, a DCI message, or both, which schedules a CG-PUSCH. By way of another example, both the first and second PUSCH messages may include CG-PUSCH messages which are scheduled via RRC signaling, DCI signaling, or both.

At 520, the UE 115-*b* may receive third signaling (e.g., RRC message, DCI message, or both) that schedules a third PUSCH message from the UE 115-*b* to the base station 105-*b*. The third PUSCH message may include a DG-PUSCH or a CG-PUSCH. In some aspects, third PUSCH message may be scheduled within the same component carrier (or different component carrier) as the first PUSCH message and/or the second PUSCH message. Moreover, the third PUSCH message may at least partially overlap in time with the first PUSCH message, the second PUSCH message, or both. The base station 105-*b* may transmit the third signaling based on the transmission configuration for temporally overlapping PUSCHs which was indicated at 505. Additionally, or alternatively, the base station 105-*b* may transmit the third signaling based on scheduling the first PUSCH message via the first signaling at 510, scheduling the second PUSCH message via the second signaling at 515, or both.

At 525, the UE 115-*b* may identify PUSCH groups associated with each of the respective PUSCH messages. In other words, the UE 115-*b* may identify which PUSCH group (e.g., which set of PUSCH messages) each of the first, second, and third PUSCH message belongs to. The UE 115-*b* may be configured to identify PUSCH groups for each respective PUSCH message in accordance with the transmission configuration indicated at 505. In particular, in accordance with a first transmission configuration, the UE 115-*b* may be able to transmit multiple temporally overlapping PUSCH messages if the respective PUSCH messages belong to different PUSCH groups (e.g., belong to different sets of PUSCH groups). In this regard, the UE 115-*b* may be configured to identify the PUSCH groups for the respective PUSCH messages based on receiving the transmission configuration at 505, receiving the first signaling at 510, receiving the second signaling at 510, receiving the third signaling at 520, or any combination thereof.

The PUSCH groups (e.g., sets of PUSCH messages) for each of the respective PUSCH messages may be defined and/or determined according to one or more parameters or characteristics. For example, PUSCH groups may be defined or based on parameters including, but not limited to, CORESET pool indexes (e.g., CORESETPoolIndex), uplink beam groups (e.g., UE panel identifiers, TCI states, spatial relationships for uplink beam groups, SRS resource set identifiers), uplink power control closed loop indexes, antenna ports (e.g., PUSCH antenna ports, SRS antenna ports, DMRS antenna ports), CDM groups, TAG identifiers, PCIs, SSB sets for the respective PUSCH messages, or any combination thereof.

For example, the UE 115-*b* may identify that the first and second PUSCH messages belong to different PUSCH groups (e.g., different sets of PUSCH messages) based on the first and second PUSCH messages being associated with different CORESET pool indexes. By way of another example, the UE 115-*b* may identify that the first and second PUSCH messages belong to different PUSCH groups (e.g., different sets of PUSCH messages) based on the first and second PUSCH messages being associated with different uplink power control closed loop indexes (e.g., 0 and 1). By way of another example, the UE 115-*b* may identify that the first and second PUSCH messages belong to different PUSCH groups (e.g., different sets of PUSCH messages) based on the first and second PUSCH messages being associated with different uplink beam groups, where the uplink beam groups are determined based on UE panel identifiers, uplink TCIs, SRS resource set identifiers, or any combination thereof. In some cases, the respective PUSCH groups may be determined according to more than one parameter associated with each respective PUSCH message.

The respective parameters/characteristics used to determine the PUSCH groups (e.g., sets of PUSCH messages) at 525 may be received via the signaling used to schedule the respective PUSCH messages at 510, 515, and 520. In this regard, parameters indicating PUSCH groups may be indicated to the UE 115-*b* via RRC signaling, DCI signaling, other control signaling, or any combination thereof. For example, in cases where the first signaling includes a DCI message that schedules a DG-PUSCH message, the parameters used to indicate the PUSCH group for the DG-PUSCH message may be indicated via the DCI message. By way of another example, in cases where the second signaling includes an RRC message, a DCI message, or both, that schedule a CG-PUSCH message, the parameters used to indicate the PUSCH group for the CG-PUSCH message may be indicated via the RRC message, the DCI message, or both.

At 530, the UE 115-*b* may identify a priority (e.g., logical channel priority) associated with the respective PUSCH messages. More specifically, the UE 115-*b* may be configured to identify the priorities of the respective PUSCH messages in cases where the UE 115-*b* is configured and/or activated with logical channel based prioritization (e.g., lch-basedPrioritization). The UE 115-*b* may be configured to identify logical channel priorities for each respective PUSCH message in accordance with the transmission configuration indicated at 505. In particular, in accordance with some transmission configurations, the UE 115-*b* may determine which of the first, second, and third temporally overlapping PUSCH messages may be transmitted based on the relative logical channel priorities of the respective PUSCH messages. In this regard, the UE 115-*b* may be configured to identify the priorities for the respective PUSCH messages based on receiving the transmission configuration at 505, receiving the first signaling at 510, receiving the second signaling at 510, receiving the third signaling at 520, or any combination thereof.

In some cases, logical channel based prioritization (e.g., lch-basedPrioritization) may be configured, activated, or otherwise enabled on a PUSCH group basis. In other words, logical channel based prioritization may be configured for a first PUSCH group (e.g., first set of PUSCH messages), but not for a second PUSCH group (e.g., second set of PUSCH messages). In this regard, the UE 115-*b* may be configured to identify logical channel priorities for the respective PUSCH messages based on identifying the PUSCH groups for the respective PUSCH messages at 525. In particular, the UE 115-*b* may be configured to identify logical channel priorities only for PUSCH messages which are associated with a PUSCH group in which logical channel based prioritization is activated/configured.

At 535, the UE 115-*b* may refrain from transmitting the third PUSCH message which was scheduled at 520 (e.g., drop the third PUSCH message). The UE 115-*b* may be configured to drop the third PUSCH message based on the third PUSCH message being scheduled in the same component carrier as the first and second PUSCH messages and/or based on the third PUSCH message overlapping in time with both the first and second PUSCH messages. Moreover, the UE 115-*b* may be configured to drop the third PUSCH message at 535 in accordance with the transmission configuration received at 505.

In this regard, the UE 115-*b* may be configured to drop the third PUSCH message based on receiving the transmission configuration at 505, receiving the first signaling at 510, receiving the second signaling at 515, receiving the third signaling at 520, identifying the PUSCH groups at 525, identifying the logical channel priorities at 530, or any combination thereof. As such, the UE 115-*b* may be configured to drop the third PUSCH message based on a comparison of the PUSCH groups of the respective PUSCH messages, a comparison of the priorities of the respective PUSCH messages, the types of PUSCH messages (e.g., DG-PUSCH, CG-PUSCH), or any combination thereof.

For example, in accordance with some transmission configurations, the UE 115-*b* may be unable to transmit temporally overlapping PUSCH messages which belong to the same PUSCH group (e.g., belong to the same set of PUSCH messages). In this regard, the UE 115-*b* may drop the third PUSCH message based on the third PUSCH message belonging to the same PUSCH group as the first and/or second PUSCH message. Moreover, in accordance with other transmission configurations, the UE 115-*b* may be configured to choose between temporally overlapping PUSCH messages within the same PUSCH group. In this regard, the UE 115-*b* may be configured to drop the third PUSCH message based on the third PUSCH message belonging to the same PUSCH group as the first and/or second PUSCH message and being associated with a lower logical channel priority as the respective first/second PUSCH message.

In cases where the third PUSCH message includes a CG-PUSCH message, the UE 115-*b* may be configured to drop the third PUSCH message based on a timeline between the third PUSCH message and DCI message(s) scheduling the first/second PUSCH messages being satisfied. For example, as described previously herein, the UE 115-*b* may drop the third PUSCH message (e.g., CG-PUSCH) if a time interval between a third PUSCH message and a DCI message scheduling the first/second PUSCH message satisfies (e.g., is greater than or equal to) a threshold time interval (e.g., ≥N2 slots).

At 540, the UE 115-*b* may transmit the first and second PUSCH messages to the base station 105-*b*. As noted previously herein, the first and second PUSCH messages may be transmitted in the same component carrier, and may at least partially overlap in time. Moreover, one or more of the first and second PUSCH messages may include a CG-PUSCH message. In some aspects, the UE 115-*b* may be configured to transmit the first and second PUSCH messages at 540 in accordance with the transmission configuration received at 505. In particular, transmission configuration may be associated with one or more criteria for transmitting temporally overlapping PUSCH messages, and the UE 115-*b* may transmit the first PUSCH message and the second PUSCH message based on one or more criteria being satisfied.

For example, in accordance with some transmission configurations, the UE 115-*b* may transmit the first and second PUSCH messages based on the first and second PUSCH messages belonging to different PUSCH groups (e.g., belonging to different sets of PUSCH messages). In accordance with additional or alternative transmission configurations, the UE 115-*b* may transmit the first and second PUSCH messages based on a comparison of logical channel priorities associated with the first, second, and third PUSCH messages. For example, the UE 115-*b* may transmit the first and second PUSCH messages at 540 based on the first PUSCH message, the second PUSCH message, or both, being associated with a higher logical channel priority as compared to the third PUSCH message.

Techniques described herein may facilitate more efficient use of resources by enabling the UE **115-*b* to transmit PUSCH messages which at least partially overlap in time. In particular, techniques described herein may enable the UE 115-*b* to transmit CG-PUSCHs which at least partially overlap in the time domain with other PUSCHs, such as another CG-PUSCH or a DG-PUSCH. Accordingly, techniques described herein may enable more efficient scheduling of uplink communications at the UE 115-*b***, reduce latency, and lead to a more efficient use of resources within the wireless communications system.

Figure 6:
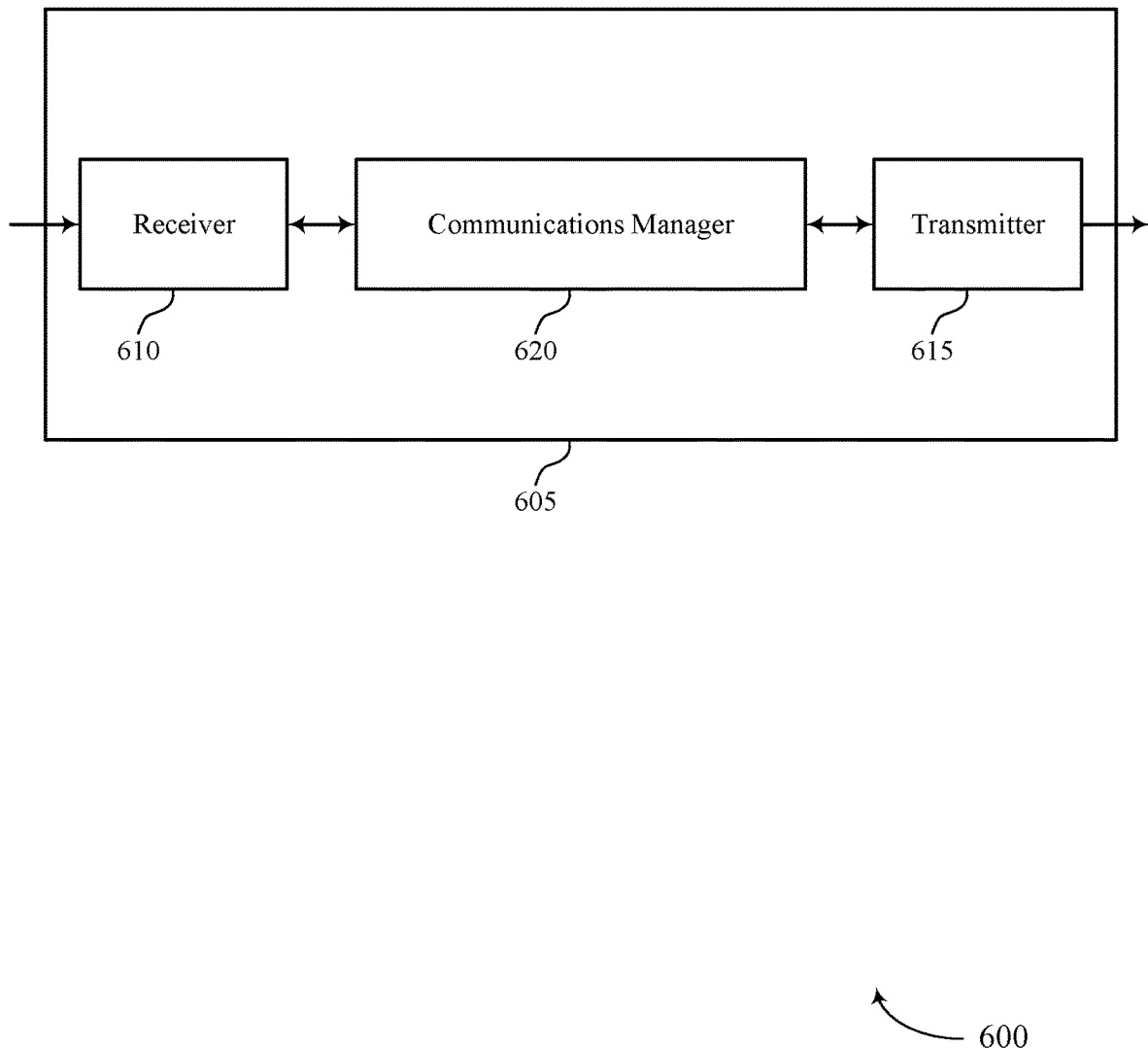
FIGS. 6 and 7 show block diagrams of devices that support techniques for performing overlapping configured grant and dynamic grant PUSCH transmissions in accordance with aspects of the present disclosure.

FIG. 6 shows a block diagram 600 of a device 605 that supports techniques for performing overlapping configured grant and dynamic grant PUSCH transmissions in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for performing overlapping configured grant and dynamic grant PUSCH transmissions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for performing overlapping configured grant and dynamic grant PUSCH transmissions). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for performing overlapping configured grant and dynamic grant PUSCH transmissions as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, from a base station, first signaling that schedules a first uplink shared channel message from the UE to the base station within a first component carrier. The communications manager 620 may be configured as or otherwise support a means for receiving, from the base station, second signaling that schedules a second uplink shared channel message from the UE to the base station within the first component carrier, where the second uplink shared channel message at least partially overlaps in time with the first uplink shared channel message, and where at least one of the first uplink shared channel message or the second uplink shared channel message includes a configured grant uplink shared channel message. The communications manager 620 may be configured as or otherwise support a means for transmitting the first and second uplink shared channel messages to the base station in accordance with a transmission configuration for transmitting temporally overlapping uplink shared channel messages.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for transmission of multiple temporally overlapping PUSCH messages. In particular, techniques described herein may enable UEs 115 to transmit CG-PUSCHs which at least partially overlap in the time domain with other PUSCHs, such as another CG-PUSCH or a DG-PUSCH. Accordingly, techniques described herein may enable more efficient scheduling of uplink communications at UEs 115, reduce latency, and lead to a more efficient use of resources within the wireless communications system.

Figure 7:
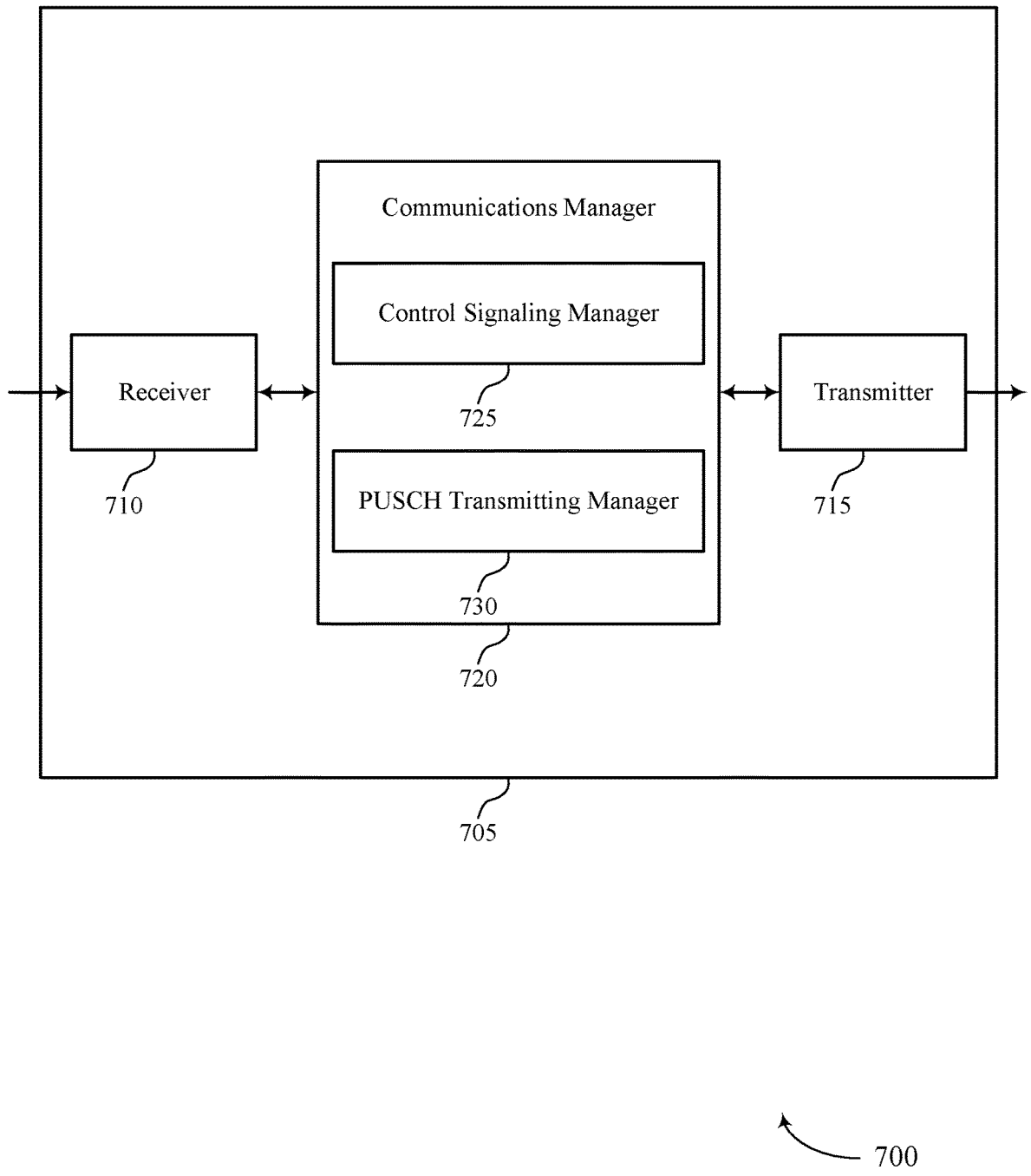

FIG. 7 shows a block diagram 700 of a device 705 that supports techniques for performing overlapping configured grant and dynamic grant PUSCH transmissions in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for performing overlapping configured grant and dynamic grant PUSCH transmissions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for performing overlapping configured grant and dynamic grant PUSCH transmissions). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for performing overlapping configured grant and dynamic grant PUSCH transmissions as described herein. For example, the communications manager 720 may include a control signaling manager 725 an PUSCH transmitting manager 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The control signaling manager 725 may be configured as or otherwise support a means for receiving, from a base station, first signaling that schedules a first uplink shared channel message from the UE to the base station within a first component carrier. The control signaling manager 725 may be configured as or otherwise support a means for receiving, from the base station, second signaling that schedules a second uplink shared channel message from the UE to the base station within the first component carrier, where the second uplink shared channel message at least partially overlaps in time with the first uplink shared channel message, and where at least one of the first uplink shared channel message or the second uplink shared channel message includes a configured grant uplink shared channel message. The PUSCH transmitting manager 730 may be configured as or otherwise support a means for transmitting the first and second uplink shared channel messages to the base station in accordance with a transmission configuration for transmitting temporally overlapping uplink shared channel messages.

Figure 8:
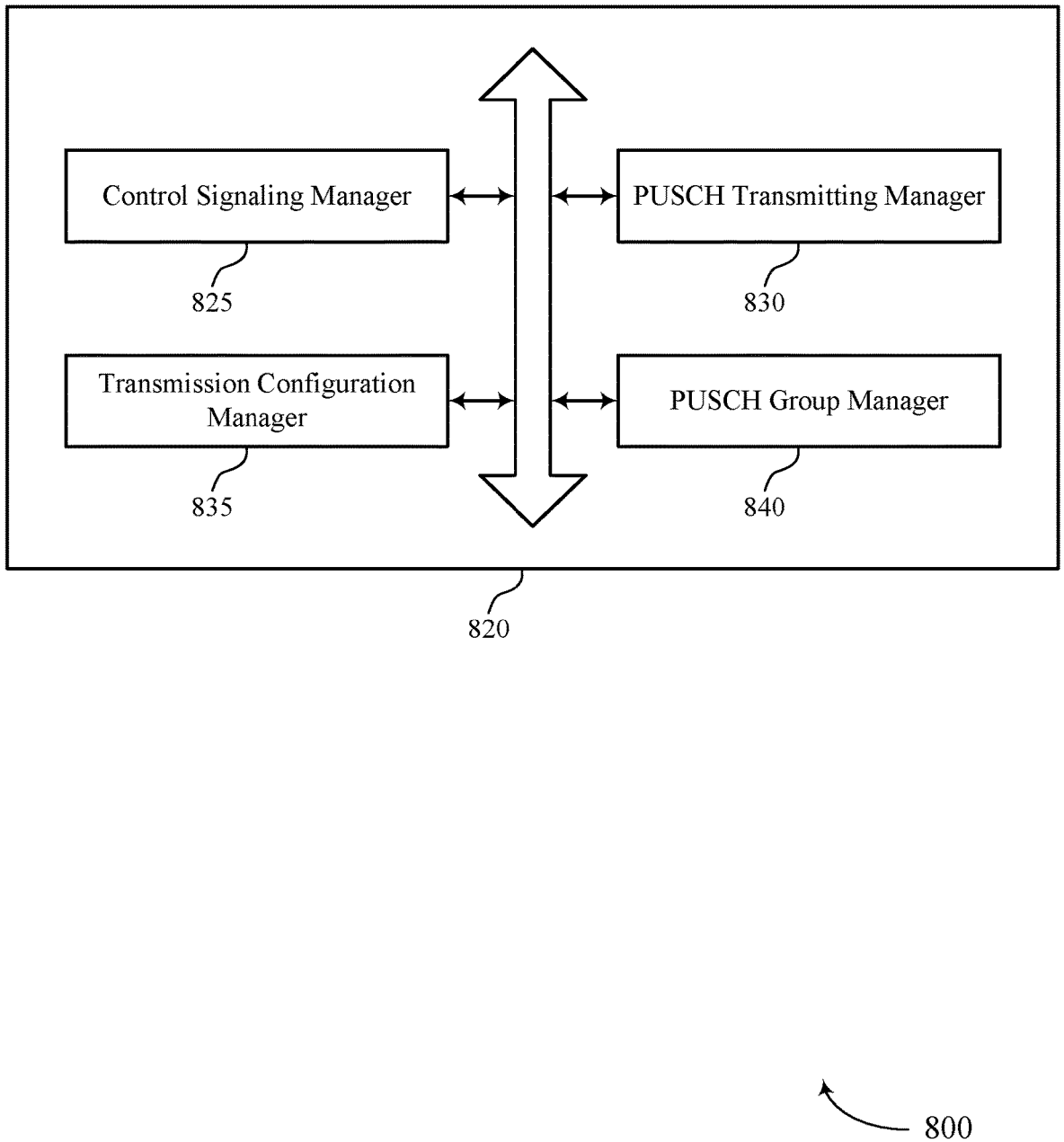
FIG. 8 shows a block diagram of a communications manager that supports techniques for performing overlapping configured grant and dynamic grant PUSCH transmissions in accordance with aspects of the present disclosure.

FIG. 8 shows a block diagram 800 of a communications manager 820 that supports techniques for performing overlapping configured grant and dynamic grant PUSCH transmissions in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for performing overlapping configured grant and dynamic grant PUSCH transmissions as described herein. For example, the communications manager 820 may include a control signaling manager 825, an PUSCH transmitting manager 830, a transmission configuration manager 835, an PUSCH group manager 840, or any combination thereof. Each of these components may communicate, directly or indirectly, with one another (e.g., via one or more buses).

The communications manager 820 may support wireless communication at a UE in accordance with examples as disclosed herein. The control signaling manager 825 may be configured as or otherwise support a means for receiving, from a base station, first signaling that schedules a first uplink shared channel message from the UE to the base station within a first component carrier. In some examples, the control signaling manager 825 may be configured as or otherwise support a means for receiving, from the base station, second signaling that schedules a second uplink shared channel message from the UE to the base station within the first component carrier, where the second uplink shared channel message at least partially overlaps in time with the first uplink shared channel message, and where at least one of the first uplink shared channel message or the second uplink shared channel message includes a configured grant uplink shared channel message. The PUSCH transmitting manager 830 may be configured as or otherwise support a means for transmitting the first and second uplink shared channel messages to the base station in accordance with a transmission configuration for transmitting temporally overlapping uplink shared channel messages.

In some examples, to support transmitting the first and second uplink shared channel messages in accordance with the transmission configuration, the PUSCH transmitting manager 830 may be configured as or otherwise support a means for transmitting the first and second uplink shared channel messages based on a comparison of a first set of one or more parameters associated with the first uplink shared channel message and a second set of one or more parameters associated with the second uplink shared channel message, where the first set of one or more parameters, the second set of one or more parameters, or both, correspond to a grouping of uplink shared channel messages, include a logical channel priority, or both.

In some examples, the transmission configuration manager 835 may be configured as or otherwise support a means for receiving, from the base station, an indication of the transmission configuration, where transmitting the first and second uplink shared channel messages is based on receiving the indication of the transmission configuration.

In some examples, to support transmitting the first and second uplink shared channel messages in accordance with the transmission configuration, the PUSCH transmitting manager 830 may be configured as or otherwise support a means for transmitting the first and second uplink shared channel messages based on the first uplink shared channel message being associated with a first set of uplink shared channel messages and the second uplink shared channel message being associated with a second set of uplink shared channel messages that is different from the first set of uplink shared channel messages.

In some examples, the PUSCH group manager 840 may be configured as or otherwise support a means for identifying that the first uplink shared channel message and the second uplink shared channel message belong to the first and second sets of uplink shared channel messages, respectively, based on a first CORESET pool index associated with the first uplink shared channel message being different than a second CORESET pool index associated with the second uplink shared channel message, where transmitting the first and second uplink shared channel messages in accordance with the transmission configuration is based on the identifying.

In some examples, the first uplink shared channel message includes the configured grant uplink shared channel message and the first signaling includes an RRC message, and the PUSCH group manager 840 may be configured as or otherwise support a means for identifying the first CORESET pool index associated with the first uplink shared channel message based on one or more parameters received via the RRC message, a CORESET associated with the DCI message, or both.

In some examples, the PUSCH group manager 840 may be configured as or otherwise support a means for identifying that the first uplink shared channel message and the second uplink shared channel message belong to the first and second sets of uplink shared channel messages, respectively, based on a first uplink beam group associated with the first uplink shared channel message being different than a second uplink beam group associated with the second uplink shared channel message, where transmitting the first and second uplink shared channel messages in accordance with the transmission configuration is based on the identifying.

In some examples, the PUSCH group manager 840 may be configured as or otherwise support a means for identifying the first uplink beam group, the second uplink beam group, or both, based on one or more parameters associated with the first uplink shared channel message and the second uplink shared channel message, the one or more parameters including a UE panel identifier, an uplink TCI, an SRS resource set identifier, or any combination thereof.

In some examples, the PUSCH group manager 840 may be configured as or otherwise support a means for identifying that the first uplink shared channel message and the second uplink shared channel message belong to the first and second sets of uplink shared channel messages, respectively, based on a first set of one or more parameters associated with the first uplink shared channel message being different than a second set of one or more parameters associated with the second uplink shared channel message, where transmitting the first and second uplink shared channel messages is based on the identifying, where the first set of one or more parameters is different from the second set of one or more parameters.

In some examples, the first set of one or more parameters, the second set of one or more parameters, or both, include an uplink power control closed loop index, an antenna port, a CDM group, a TAG identifier, a PCID, an SSB set, or any combination thereof.

In some examples, the control signaling manager 825 may be configured as or otherwise support a means for receiving, from the base station, third signaling that schedules a third uplink shared channel message from the UE to the base station within the first component carrier, where the third uplink shared channel message at least partially overlaps in time with the first uplink shared channel message. In some examples, the PUSCH transmitting manager 830 may be configured as or otherwise support a means for refraining from transmitting the third uplink shared channel message in accordance with the transmission configuration based on the first uplink shared channel message and the third uplink shared channel message at least partially overlapping in time and being associated with a same set of uplink shared channel messages.

In some examples, the first uplink shared channel message includes a dynamic grant uplink shared channel message, and the PUSCH transmitting manager 830 may be configured as or otherwise support a means for refraining from transmitting the third uplink shared channel message in accordance with the transmission configuration based on the third uplink shared channel message including a second configured grant uplink shared channel message.

In some examples, the PUSCH transmitting manager 830 may be configured as or otherwise support a means for refraining from transmitting the third uplink shared channel message in accordance with the transmission configuration based on the third uplink shared channel message having a second logical channel priority that is less than or equal to a first logical channel priority associated with the first uplink shared channel message.

In some examples, the first uplink shared channel message includes a dynamic grant uplink shared channel message, and the PUSCH transmitting manager 830 may be configured as or otherwise support a means for refraining from transmitting the third uplink shared channel message in accordance with the transmission configuration based on a time interval between the DCI message and the third uplink shared channel message satisfying a threshold time interval.

In some examples, the control signaling manager 825 may be configured as or otherwise support a means for receiving, from the base station, third signaling that schedules a third uplink shared channel message from the UE to the base station within the first component carrier, where the third uplink shared channel message at least partially overlaps in time with the first and second uplink shared channel messages. In some examples, the PUSCH transmitting manager 830 may be configured as or otherwise support a means for refraining from transmitting the third uplink shared channel message in accordance with the transmission configuration based on the third uplink shared channel message at least partially overlapping in time with the first and second uplink shared channel messages and based on a set of uplink shared channel messages associated with the third uplink shared channel message, a logical channel priority associated with the third uplink shared channel message, or both.

In some examples, the first uplink shared channel message includes the configured grant uplink shared channel message, and the control signaling manager 825 may be configured as or otherwise support a means for receiving, from the base station, third signaling that schedules a third uplink shared channel message from the UE to the base station within the first component carrier, where the third uplink shared channel message at least partially overlaps in time with the first and second uplink shared channel messages. In some examples, the first uplink shared channel message includes the configured grant uplink shared channel message, and the PUSCH transmitting manager 830 may be configured as or otherwise support a means for refraining from transmitting the third uplink shared channel message in accordance with the transmission configuration based on the third uplink shared channel message at least partially overlapping in time with the first and second uplink shared channel messages, and based on both the first and third uplink shared channel messages including configured grant uplink shared channel messages.

In some examples, the PUSCH transmitting manager 830 may be configured as or otherwise support a means for refraining from transmitting the third uplink shared channel message in accordance with the transmission configuration based at least on part on a first set of one or more parameters associated with the first uplink shared channel message and a second set of one or more parameters associated with the third uplink shared channel message, where the first set of one or more parameters, the second set of one or more parameters, or both, includes a configured grant index, a periodicity, an initial transmit time, a duration, a quantity of resource blocks, an extent of temporal overlap with the second uplink shared channel message, an extent of frequency overlap with the second uplink shared channel message, a demodulation reference signal symbol location, a CDM group, or any combination thereof.

In some examples, the third uplink shared channel message includes a second configured grant uplink shared channel message, and the PUSCH transmitting manager 830 may be configured as or otherwise support a means for transmitting the first uplink shared channel message based on a first time interval between the DCI message and the first uplink shared channel message satisfying a threshold time interval.

In some examples, the control signaling manager 825 may be configured as or otherwise support a means for receiving, from the base station, third signaling that schedules a first dynamic grant uplink shared channel message and a second dynamic grant uplink shared channel message from the UE to the base station within a second component carrier. In some examples, the control signaling manager 825 may be configured as or otherwise support a means for receiving, from the base station, fourth signaling that schedules a second configured grant uplink shared channel message from the UE to the base station within the second component carrier, where the second configured grant uplink shared channel message at least partially overlaps in time with the first and second dynamic grant uplink shared channel messages. In some examples, the PUSCH transmitting manager 830 may be configured as or otherwise support a means for refraining from transmitting the second configured grant uplink shared channel message based on the second configured grant uplink shared channel message at least partially overlapping in time with the first and second dynamic grant uplink shared channel messages.

In some examples, the control signaling manager 825 may be configured as or otherwise support a means for receiving, from the base station, third signaling that schedules a third uplink shared channel message from the UE to the base station within the first component carrier, where the third uplink shared channel message at least partially overlaps in time with the first and second uplink shared channel messages. In some examples, the PUSCH transmitting manager 830 may be configured as or otherwise support a means for refraining from transmitting the third uplink shared channel message based on the third uplink shared channel message at least partially overlapping in time with the first and second uplink shared channel messages, and based on the third uplink shared channel message having a third logical channel priority that is less than or equal to a first logical channel priority associated with the first uplink shared channel message and a second logical channel priority associated with the first uplink shared channel message.

In some examples, the first uplink shared channel message includes a first configured grant uplink shared channel message. In some examples, the second uplink shared channel message includes a second configured grant uplink shared channel message.

Figure 9:
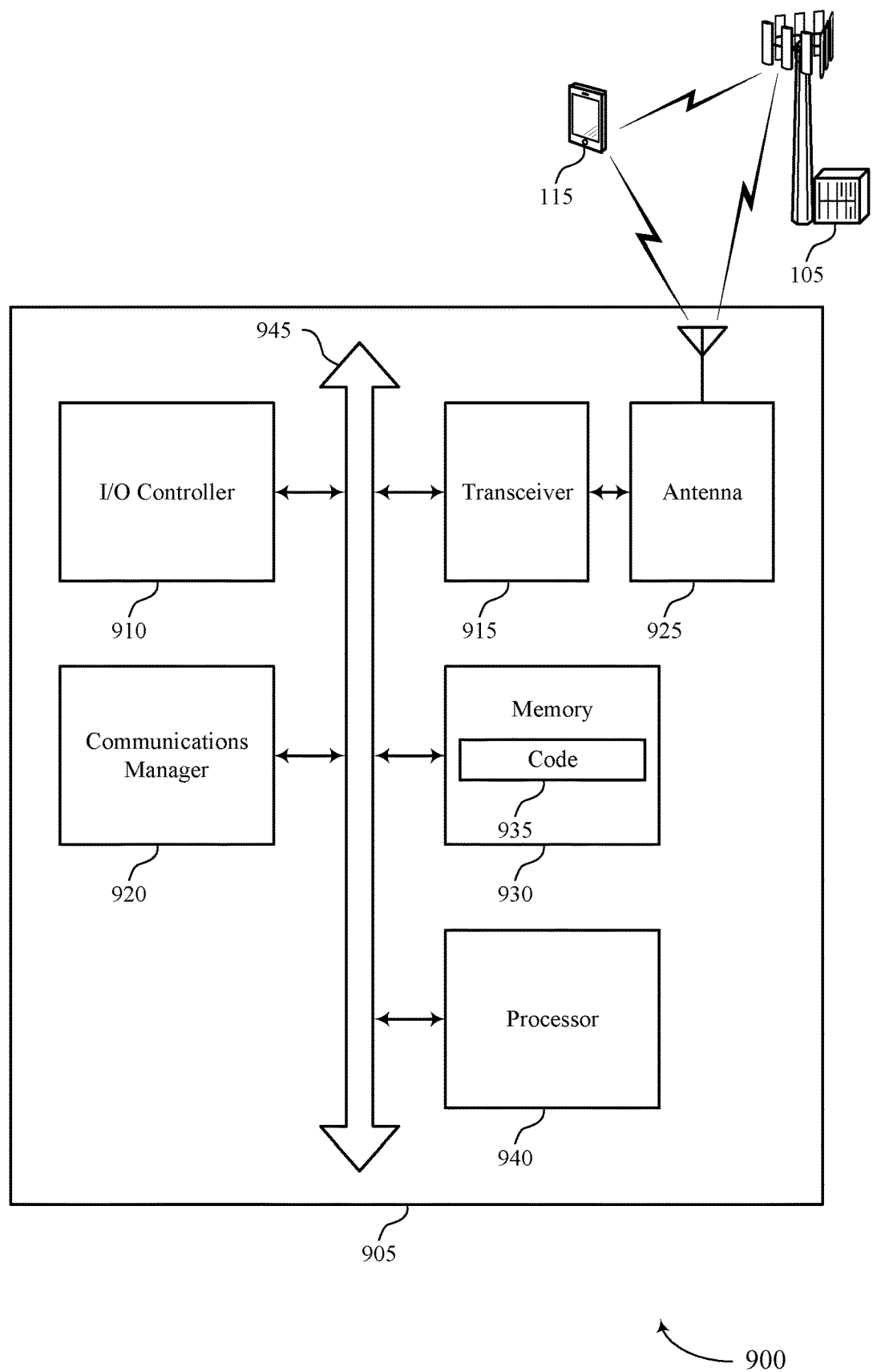
FIG. 9 shows a diagram of a system including a device that supports techniques for performing overlapping configured grant and dynamic grant PUSCH transmissions in accordance with aspects of the present disclosure.

FIG. 9 shows a diagram of a system 900 including a device 905 that supports techniques for performing overlapping configured grant and dynamic grant PUSCH transmissions in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for performing overlapping configured grant and dynamic grant PUSCH transmissions). For example, the device 905 or a component of the device 905 may include a processor 940 and memory 930 coupled with the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a base station, first signaling that schedules a first uplink shared channel message from the UE to the base station within a first component carrier. The communications manager 920 may be configured as or otherwise support a means for receiving, from the base station, second signaling that schedules a second uplink shared channel message from the UE to the base station within the first component carrier, where the second uplink shared channel message at least partially overlaps in time with the first uplink shared channel message, and where at least one of the first uplink shared channel message or the second uplink shared channel message includes a configured grant uplink shared channel message. The communications manager 920 may be configured as or otherwise support a means for transmitting the first and second uplink shared channel messages to the base station in accordance with a transmission configuration for transmitting temporally overlapping uplink shared channel messages.

By including or configuring the communications manager 920 in accordance with examples as described herein, the device 905 may support techniques for transmission of multiple temporally overlapping PUSCH messages. In particular, techniques described herein may enable UEs 115 to transmit CG-PUSCHs which at least partially overlap in the time domain with other PUSCHs, such as another CG-PUSCH or a DG-PUSCH. Accordingly, techniques described herein may enable more efficient scheduling of uplink communications at UEs 115, reduce latency, and lead to a more efficient use of resources within the wireless communications system.

In some examples, the communications manager 920 may be configured to perform various operations (e.g., receiving, monitoring, transmitting) using or otherwise in cooperation with the transceiver 915, the one or more antennas 925, or any combination thereof. For example, the communications manager 920 may be configured to receive or transmit messages or other signaling as described herein via the transceiver 915. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for performing overlapping configured grant and dynamic grant PUSCH transmissions as described herein, or the processor 940 and the memory 930 may be otherwise configured to perform or support such operations.

Figure 10:
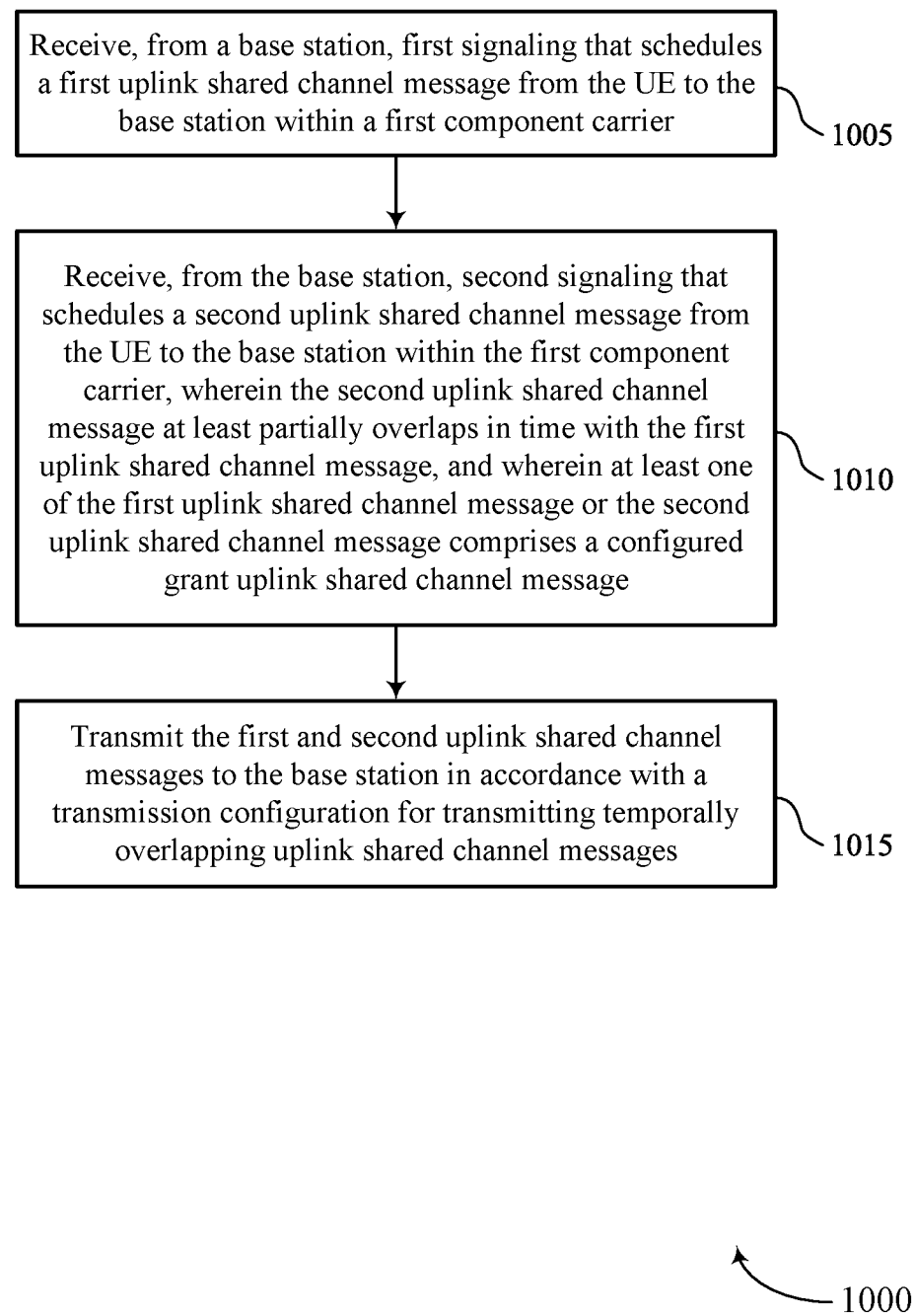
FIGS. 10 through 13 show flowcharts illustrating methods that support techniques for performing overlapping configured grant and dynamic grant PUSCH transmissions in accordance with aspects of the present disclosure.

FIG. 10 shows a flowchart illustrating a method 1000 that supports techniques for performing overlapping configured grant and dynamic grant PUSCH transmissions in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving, from a base station, first signaling that schedules a first uplink shared channel message from the UE to the base station within a first component carrier. The operations of 1005 may be performed in accordance with examples as disclosed herein. In some examples, aspects of the operations of 1005 may be performed by a control signaling manager 825 as described with reference to FIG. 8. Additionally or alternatively, means for performing 1005 may, but not necessarily, include, for example, antenna 925, transceiver 915, communications manager 920, memory 830 (including code 935), processor 940 and/or bus 945.

At 1010, the method may include receiving, from the base station, second signaling that schedules a second uplink shared channel message from the UE to the base station within the first component carrier, where the second uplink shared channel message at least partially overlaps in time with the first uplink shared channel message, and where at least one of the first uplink shared channel message or the second uplink shared channel message includes a configured grant uplink shared channel message. The operations of 1010 may be performed in accordance with examples as disclosed herein. In some examples, aspects of the operations of 1010 may be performed by a control signaling manager 825 as described with reference to FIG. 8. Additionally or alternatively, means for performing 1010 may, but not necessarily, include, for example, antenna 925, transceiver 915, communications manager 920, memory 830 (including code 935), processor 940 and/or bus 945.

At 1015, the method may include transmitting the first and second uplink shared channel messages to the base station in accordance with a transmission configuration for transmitting temporally overlapping uplink shared channel messages. The operations of 1015 may be performed in accordance with examples as disclosed herein. In some examples, aspects of the operations of 1015 may be performed by an PUSCH transmitting manager 830 as described with reference to FIG. 8. Additionally or alternatively, means for performing 1015 may, but not necessarily, include, for example, antenna 925, transceiver 915, communications manager 920, memory 830 (including code 935), processor 940 and/or bus 945.

Figure 11:
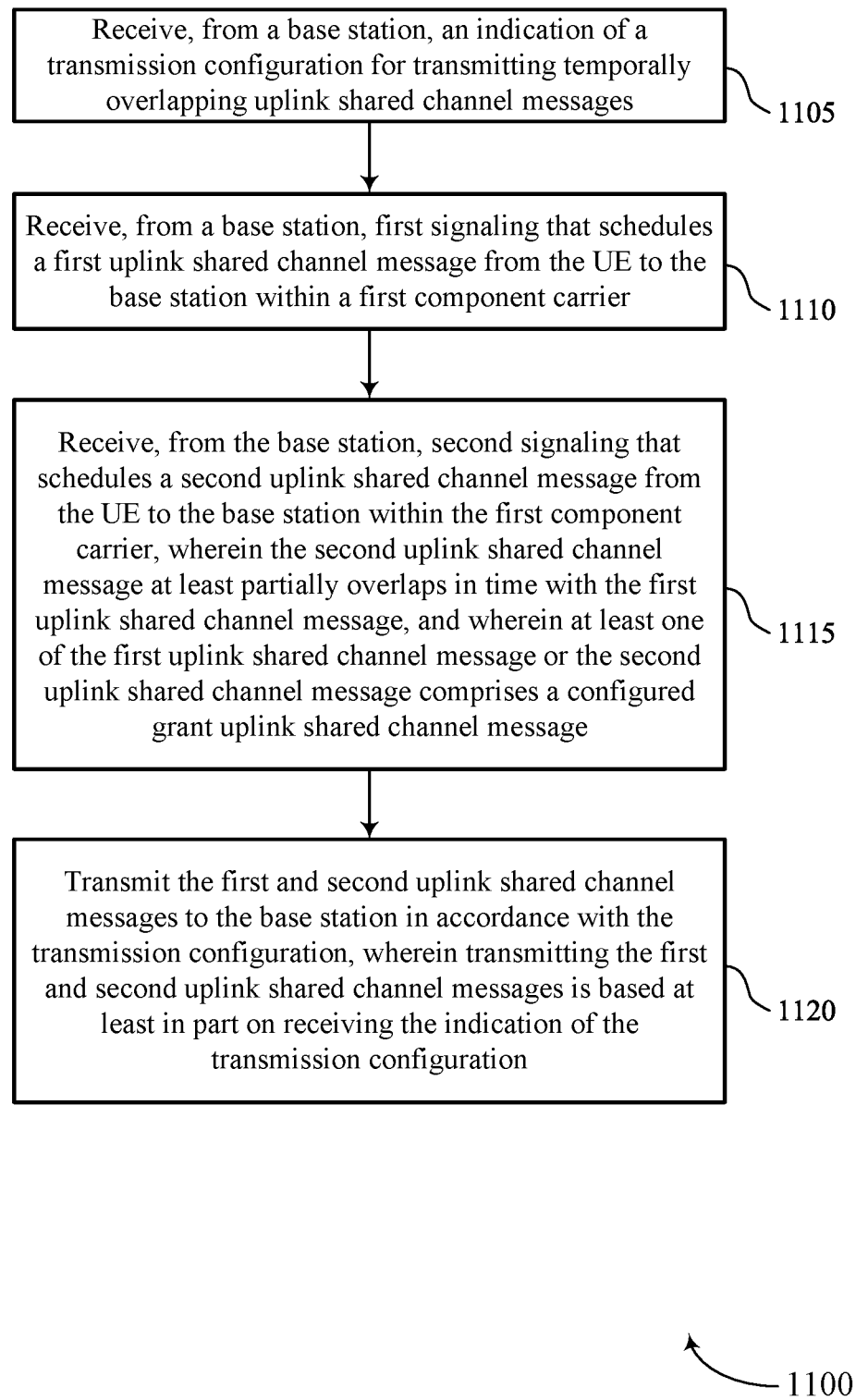

FIG. 11 shows a flowchart illustrating a method 1100 that supports techniques for performing overlapping configured grant and dynamic grant PUSCH transmissions in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving, from a base station, an indication of a transmission configuration for transmitting temporally overlapping uplink shared channel messages. The operations of 1105 may be performed in accordance with examples as disclosed herein. In some examples, aspects of the operations of 1105 may be performed by a transmission configuration manager 835 as described with reference to FIG. 8. Additionally or alternatively, means for performing 1105 may, but not necessarily, include, for example, antenna 925, transceiver 915, communications manager 920, memory 830 (including code 935), processor 940 and/or bus 945.

At 1110, the method may include receiving, from a base station, first signaling that schedules a first uplink shared channel message from the UE to the base station within a first component carrier. The operations of 1110 may be performed in accordance with examples as disclosed herein. In some examples, aspects of the operations of 1110 may be performed by a control signaling manager 825 as described with reference to FIG. 8. Additionally or alternatively, means for performing 1110 may, but not necessarily, include, for example, antenna 925, transceiver 915, communications manager 920, memory 830 (including code 935), processor 940 and/or bus 945.

At 1115, the method may include receiving, from the base station, second signaling that schedules a second uplink shared channel message from the UE to the base station within the first component carrier, where the second uplink shared channel message at least partially overlaps in time with the first uplink shared channel message, and where at least one of the first uplink shared channel message or the second uplink shared channel message includes a configured grant uplink shared channel message. The operations of 1115 may be performed in accordance with examples as disclosed herein. In some examples, aspects of the operations of 1115 may be performed by a control signaling manager 825 as described with reference to FIG. 8. Additionally or alternatively, means for performing 1115 may, but not necessarily, include, for example, antenna 925, transceiver 915, communications manager 920, memory 830 (including code 935), processor 940 and/or bus 945.

At 1120, the method may include transmitting the first and second uplink shared channel messages to the base station in accordance with the transmission configuration for transmitting temporally overlapping uplink shared channel messages, where transmitting the first and second uplink shared channel messages is based on receiving the indication of the transmission configuration. The operations of 1120 may be performed in accordance with examples as disclosed herein. In some examples, aspects of the operations of 1120 may be performed by an PUSCH transmitting manager 830 as described with reference to FIG. 8. Additionally or alternatively, means for performing 1120 may, but not necessarily, include, for example, antenna 925, transceiver 915, communications manager 920, memory 830 (including code 935), processor 940 and/or bus 945.

Figure 12:
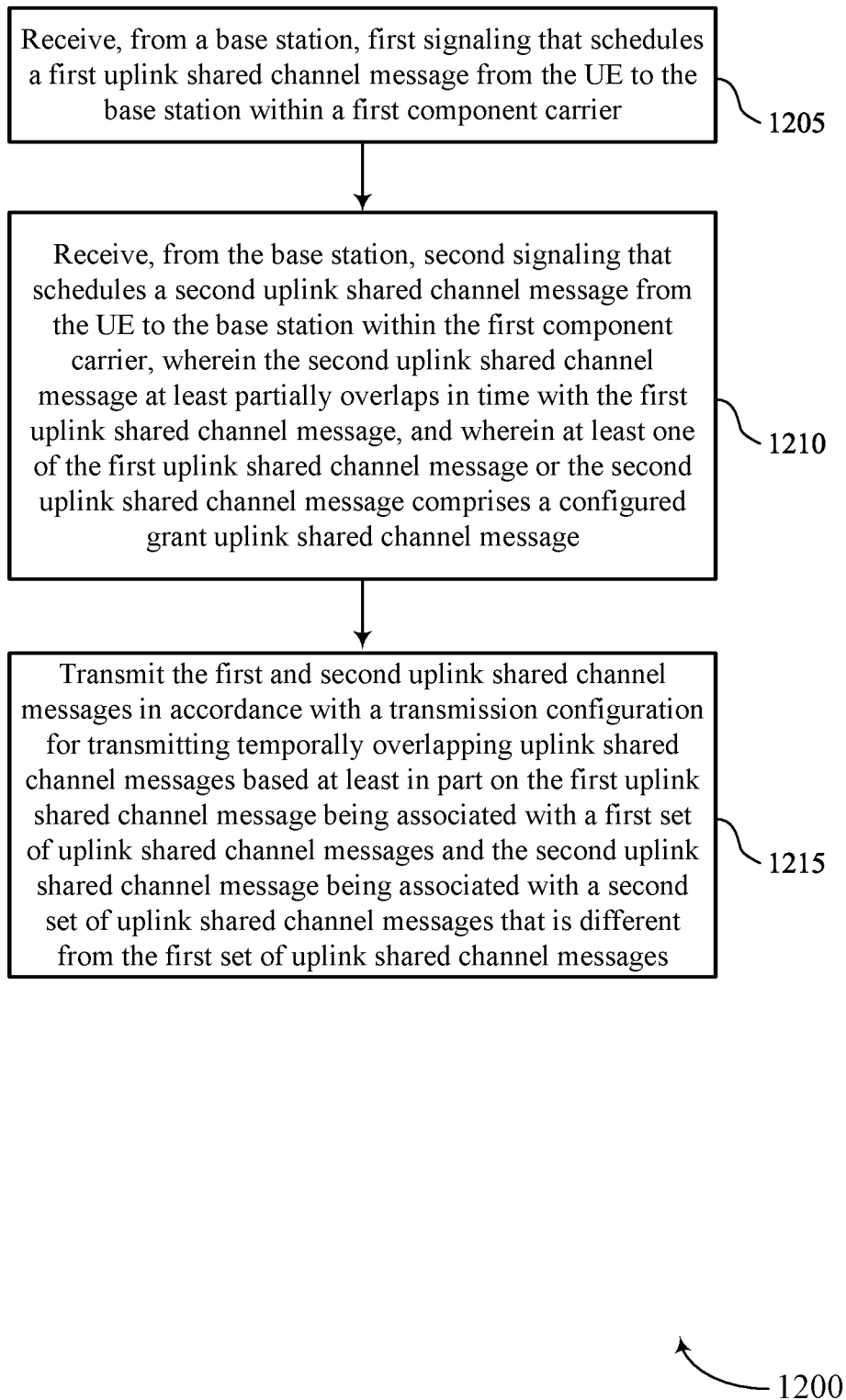

FIG. 12 shows a flowchart illustrating a method 1200 that supports techniques for performing overlapping configured grant and dynamic grant PUSCH transmissions in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, first signaling that schedules a first uplink shared channel message from the UE to the base station within a first component carrier. The operations of 1205 may be performed in accordance with examples as disclosed herein. In some examples, aspects of the operations of 1205 may be performed by a control signaling manager 825 as described with reference to FIG. 8. Additionally or alternatively, means for performing 1205 may, but not necessarily, include, for example, antenna 925, transceiver 915, communications manager 920, memory 830 (including code 935), processor 940 and/or bus 945.

At 1210, the method may include receiving, from the base station, second signaling that schedules a second uplink shared channel message from the UE to the base station within the first component carrier, where the second uplink shared channel message at least partially overlaps in time with the first uplink shared channel message, and where at least one of the first uplink shared channel message or the second uplink shared channel message includes a configured grant uplink shared channel message. The operations of 1210 may be performed in accordance with examples as disclosed herein. In some examples, aspects of the operations of 1210 may be performed by a control signaling manager 825 as described with reference to FIG. 8. Additionally or alternatively, means for performing 1210 may, but not necessarily, include, for example, antenna 925, transceiver 915, communications manager 920, memory 830 (including code 935), processor 940 and/or bus 945.

At 1215, the method may include transmitting the first and second uplink shared channel messages in accordance with a transmission configuration for transmitting temporally overlapping uplink shared channel messages based on the first uplink shared channel message being associated with a first set of uplink shared channel messages and the second uplink shared channel message being associated with a second set of uplink shared channel messages that is different from the first set of uplink shared channel messages. The operations of 1215 may be performed in accordance with examples as disclosed herein. In some examples, aspects of the operations of 1215 may be performed by an PUSCH transmitting manager 830 as described with reference to FIG. 8. Additionally or alternatively, means for performing 1215 may, but not necessarily, include, for example, antenna 925, transceiver 915, communications manager 920, memory 830 (including code 935), processor 940 and/or bus 945.

Figure 13:
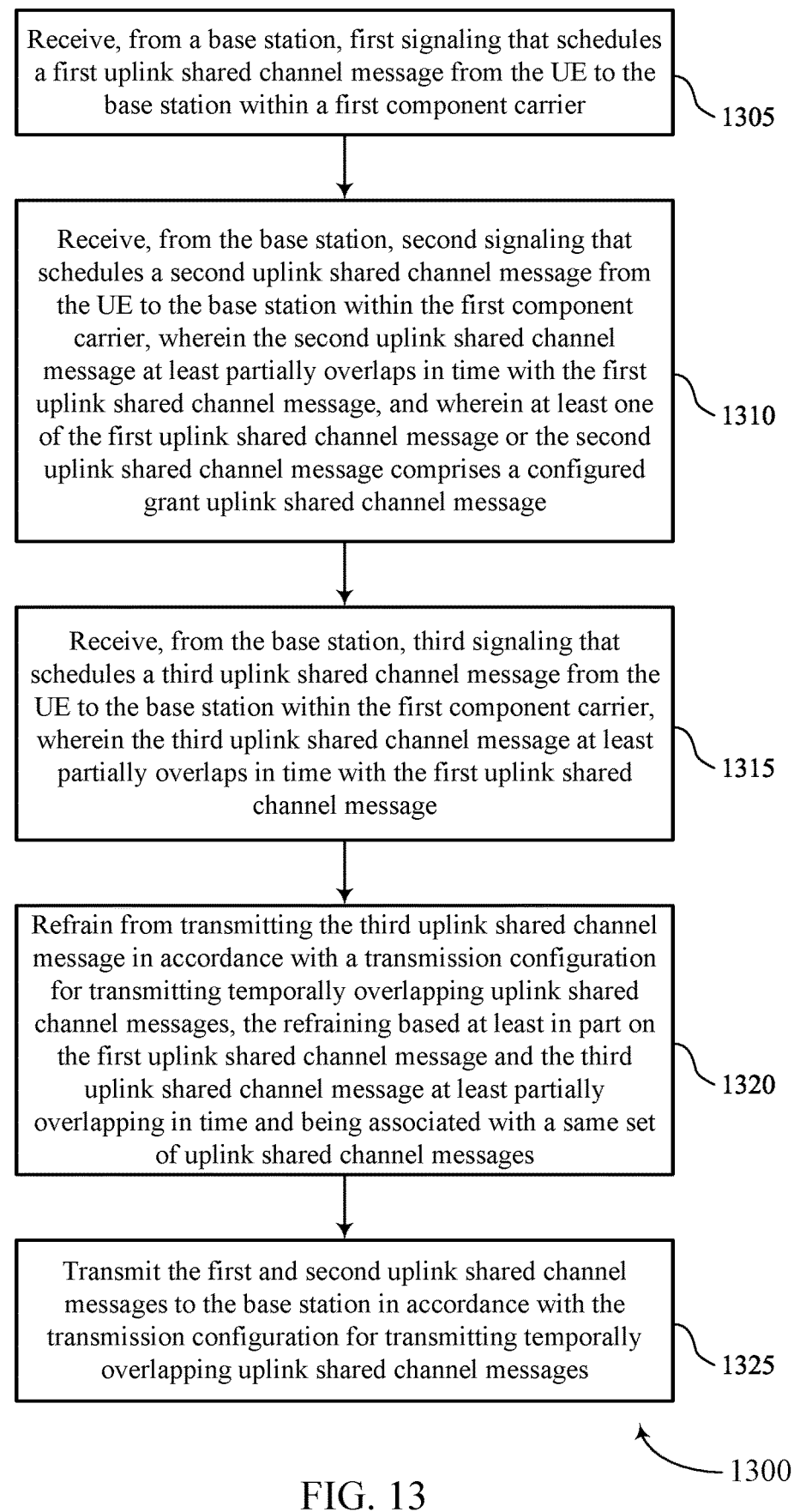

FIG. 13 shows a flowchart illustrating a method 1300 that supports techniques for performing overlapping configured grant and dynamic grant PUSCH transmissions in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, first signaling that schedules a first uplink shared channel message from the UE to the base station within a first component carrier. The operations of 1305 may be performed in accordance with examples as disclosed herein. In some examples, aspects of the operations of 1305 may be performed by a control signaling manager 825 as described with reference to FIG. 8. Additionally or alternatively, means for performing 1305 may, but not necessarily, include, for example, antenna 925, transceiver 915, communications manager 920, memory 830 (including code 935), processor 940 and/or bus 945.

At 1310, the method may include receiving, from the base station, second signaling that schedules a second uplink shared channel message from the UE to the base station within the first component carrier, where the second uplink shared channel message at least partially overlaps in time with the first uplink shared channel message, and where at least one of the first uplink shared channel message or the second uplink shared channel message includes a configured grant uplink shared channel message. The operations of 1310 may be performed in accordance with examples as disclosed herein. In some examples, aspects of the operations of 1310 may be performed by a control signaling manager 825 as described with reference to FIG. 8. Additionally or alternatively, means for performing 1310 may, but not necessarily, include, for example, antenna 925, transceiver 915, communications manager 920, memory 830 (including code 935), processor 940 and/or bus 945.

At 1315, the method may include receiving, from the base station, third signaling that schedules a third uplink shared channel message from the UE to the base station within the first component carrier, where the third uplink shared channel message at least partially overlaps in time with the first uplink shared channel message. The operations of 1315 may be performed in accordance with examples as disclosed herein. In some examples, aspects of the operations of 1315 may be performed by a control signaling manager 825 as described with reference to FIG. 8. Additionally or alternatively, means for performing 1315 may, but not necessarily, include, for example, antenna 925, transceiver 915, communications manager 920, memory 830 (including code 935), processor 940 and/or bus 945.

At 1320, the method may include refraining from transmitting the third uplink shared channel message in accordance with a transmission configuration for transmitting temporally overlapping uplink shared channel messages, the refraining based on the first uplink shared channel message and the third uplink shared channel message at least partially overlapping in time and being associated with a same set of uplink shared channel messages. The operations of 1320 may be performed in accordance with examples as disclosed herein. In some examples, aspects of the operations of 1320 may be performed by an PUSCH transmitting manager 830 as described with reference to FIG. 8. Additionally or alternatively, means for performing 1320 may, but not necessarily, include, for example, antenna 925, transceiver 915, communications manager 920, memory 830 (including code 935), processor 940 and/or bus 945.

At 1325, the method may include transmitting the first and second uplink shared channel messages to the base station in accordance with the transmission configuration for transmitting temporally overlapping uplink shared channel messages. The operations of 1325 may be performed in accordance with examples as disclosed herein. In some examples, aspects of the operations of 1325 may be performed by an PUSCH transmitting manager 830 as described with reference to FIG. 8. Additionally or alternatively, means for performing 1325 may, but not necessarily, include, for example, antenna 925, transceiver 915, communications manager 920, memory 830 (including code 935), processor 940 and/or bus 945.

The following provides an overview of aspects of the present disclosure:

Aspect 1: A method for wireless communication at a UE, comprising: receiving, from a base station, first signaling that schedules a first uplink shared channel message from the UE to the base station within a first component carrier; receiving, from the base station, second signaling that schedules a second uplink shared channel message from the UE to the base station within the first component carrier, wherein the second uplink shared channel message at least partially overlaps in time with the first uplink shared channel message, and wherein at least one of the first uplink shared channel message or the second uplink shared channel message comprises a configured grant uplink shared channel message; and transmitting the first and second uplink shared channel messages to the base station in accordance with a transmission configuration for transmitting temporally overlapping uplink shared channel messages.

Aspect 2: The method of aspect 1, wherein transmitting the first and second uplink shared channel messages in accordance with the transmission configuration comprises: transmitting the first and second uplink shared channel messages based at least in part on a comparison of a first set of one or more parameters associated with the first uplink shared channel message and a second set of one or more parameters associated with the second uplink shared channel message, wherein the first set of one or more parameters, the second set of one or more parameters, or both, correspond to a grouping of uplink shared channel messages, comprise a logical channel priority, or both.

Aspect 3: The method of any of aspects 1 through 2, further comprising: receiving, from the base station, an indication of the transmission configuration, wherein transmitting the first and second uplink shared channel messages is based at least in part on receiving the indication of the transmission configuration.

Aspect 4: The method of any of aspects 1 through 3, wherein transmitting the first and second uplink shared channel messages in accordance with the transmission configuration comprises: transmitting the first and second uplink shared channel messages based at least in part on the first uplink shared channel message being associated with a first set of uplink shared channel messages and the second uplink shared channel message being associated with a second set of uplink shared channel messages that is different from the first set of uplink shared channel messages.

Aspect 5: The method of aspect 4, further comprising: identifying that the first uplink shared channel message and the second uplink shared channel message belong to the first and second sets of uplink shared channel messages, respectively, based at least in part on a first CORESET pool index associated with the first uplink shared channel message being different than a second CORESET pool index associated with the second uplink shared channel message, wherein transmitting the first and second uplink shared channel messages in accordance with the transmission configuration is based at least in part on the identifying.

Aspect 6: The method of aspect 5, wherein the first uplink shared channel message comprises the configured grant uplink shared channel message and the first signaling comprises an RRC message, a DCI message, or both, the method further comprising: identifying the first CORESET pool index associated with the first uplink shared channel message based at least in part on one or more parameters received via the RRC message, a CORESET associated with the DCI message, or both.

Aspect 7: The method of any of aspects 4 through 6, further comprising: identifying that the first uplink shared channel message and the second uplink shared channel message belong to the first and second sets of uplink shared channel messages, respectively, based at least in part on a first uplink beam group associated with the first uplink shared channel message being different than a second uplink beam group associated with the second uplink shared channel message, wherein transmitting the first and second uplink shared channel messages in accordance with the transmission configuration is based at least in part on the identifying.

Aspect 8: The method of aspect 7, further comprising: identifying the first uplink beam group, the second uplink beam group, or both, based on one or more parameters associated with the first uplink shared channel message and the second uplink shared channel message, the one or more parameters comprising a UE panel identifier, an uplink TCI, an SRS resource set identifier, or any combination thereof.

Aspect 9: The method of any of aspects 4 through 8, further comprising: identifying that the first uplink shared channel message and the second uplink shared channel message belong to the first and second sets of uplink shared channel messages, respectively, based at least in part on a first set of one or more parameters associated with the first uplink shared channel message being different than a second set of one or more parameters associated with the second uplink shared channel message, wherein transmitting the first and second uplink shared channel messages is based at least in part on the identifying, wherein the first set of one or more parameters is different from the second set of one or more parameters.

Aspect 10: The method of aspect 9, wherein the first set of one or more parameters, the second set of one or more parameters, or both, comprise an uplink power control closed loop index, an antenna port, a CDM group, a TAG identifier, a PCI, an SSB set, or any combination thereof.

Aspect 11: The method of any of aspects 1 through 10, further comprising: receiving, from the base station, third signaling that schedules a third uplink shared channel message from the UE to the base station within the first component carrier, wherein the third uplink shared channel message at least partially overlaps in time with the first uplink shared channel message; and refraining from transmitting the third uplink shared channel message in accordance with the transmission configuration based at least in part on the first uplink shared channel message and the third uplink shared channel message at least partially overlapping in time and being associated with a same set of uplink shared channel messages.

Aspect 12: The method of aspect 11, wherein the first uplink shared channel message comprises a dynamic grant uplink shared channel message, the method further comprising: refraining from transmitting the third uplink shared channel message in accordance with the transmission configuration based at least in part on the third uplink shared channel message comprising a second configured grant uplink shared channel message.

Aspect 13: The method of any of aspects 11 through 12, further comprising: refraining from transmitting the third uplink shared channel message in accordance with the transmission configuration based at least in part on the third uplink shared channel message having a second logical channel priority that is less than or equal to a first logical channel priority associated with the first uplink shared channel message.

Aspect 14: The method of any of aspects 11 through 13, wherein the first uplink shared channel message comprises a dynamic grant uplink shared channel message, wherein the third uplink shared channel message comprises a second configured grant uplink shared channel message, and wherein the first signaling that schedules the first uplink shared channel message comprises a DCI message, the method further comprising: refraining from transmitting the third uplink shared channel message in accordance with the transmission configuration based at least in part on a time interval between the DCI message and the third uplink shared channel message satisfying a threshold time interval.

Aspect 15: The method of any of aspects 1 through 14, further comprising: receiving, from the base station, third signaling that schedules a third uplink shared channel message from the UE to the base station within the first component carrier, wherein the third uplink shared channel message at least partially overlaps in time with the first and second uplink shared channel messages; and refraining from transmitting the third uplink shared channel message in accordance with the transmission configuration based at least in part on the third uplink shared channel message at least partially overlapping in time with the first and second uplink shared channel messages and based at least in part on a set of uplink shared channel messages associated with the third uplink shared channel message, a logical channel priority associated with the third uplink shared channel message, or both.

Aspect 16: The method of any of aspects 1 through 15, wherein the first uplink shared channel message comprises the configured grant uplink shared channel message, and wherein the second uplink shared channel message comprises a dynamic grant uplink shared channel message, the method further comprising: receiving, from the base station, third signaling that schedules a third uplink shared channel message from the UE to the base station within the first component carrier, wherein the third uplink shared channel message at least partially overlaps in time with the first and second uplink shared channel messages; and refraining from transmitting the third uplink shared channel message in accordance with the transmission configuration based at least in part on the third uplink shared channel message at least partially overlapping in time with the first and second uplink shared channel messages, and based at least in part on both the first and third uplink shared channel messages comprising configured grant uplink shared channel messages.

Aspect 17: The method of aspect 16, further comprising: refraining from transmitting the third uplink shared channel message in accordance with the transmission configuration based at least on part on a first set of one or more parameters associated with the first uplink shared channel message and a second set of one or more parameters associated with the third uplink shared channel message, wherein the first set of one or more parameters, the second set of one or more parameters, or both, comprises a configured grant index, a periodicity, an initial transmit time, a duration, a quantity of resource blocks, an extent of temporal overlap with the second uplink shared channel message, an extent of frequency overlap with the second uplink shared channel message, a DMRS symbol location, a CDM group, or any combination thereof.

Aspect 18: The method of any of aspects 16 through 17, wherein the third uplink shared channel message comprises a second configured grant uplink shared channel message, and wherein the second signaling that schedules the second uplink shared channel message comprises a DCI message, the method further comprising: transmitting the first uplink shared channel message based at least in part on a first time interval between the DCI message and the first uplink shared channel message satisfying a threshold time interval.

Aspect 19: The method of any of aspects 1 through 18, further comprising: receiving, from the base station, third signaling that schedules a first dynamic grant uplink shared channel message and a second dynamic grant uplink shared channel message from the UE to the base station within a second component carrier; receiving, from the base station, fourth signaling that schedules a second configured grant uplink shared channel message from the UE to the base station within the second component carrier, wherein the second configured grant uplink shared channel message at least partially overlaps in time with the first and second dynamic grant uplink shared channel messages; and refraining from transmitting the second configured grant uplink shared channel message based at least in part on the second configured grant uplink shared channel message at least partially overlapping in time with the first and second dynamic grant uplink shared channel messages.

Aspect 20: The method of any of aspects 1 through 19, further comprising: receiving, from the base station, third signaling that schedules a third uplink shared channel message from the UE to the base station within the first component carrier, wherein the third uplink shared channel message at least partially overlaps in time with the first and second uplink shared channel messages; and refraining from transmitting the third uplink shared channel message based at least in part on the third uplink shared channel message at least partially overlapping in time with the first and second uplink shared channel messages, and based at least in part on the third uplink shared channel message having a third logical channel priority that is less than or equal to a first logical channel priority associated with the first uplink shared channel message and a second logical channel priority associated with the first uplink shared channel message.

Aspect 21: The method of any of aspects 1 through 20, wherein the first uplink shared channel message comprises a first configured grant uplink shared channel message, and the second uplink shared channel message comprises a second configured grant uplink shared channel message.

Aspect 22: An apparatus for wireless communication at a UE, comprising a processor; a transceiver coupled with the processor, and memory coupled with the processor, the processor and the memory configured to cause the apparatus to perform a method of any of aspects 1 through 21.

Aspect 23: An apparatus for wireless communication at a UE, comprising at least one means for performing a method of any of aspects 1 through 21.

Aspect 24: A non-transitory computer-readable medium storing code for wireless communication at a UE, the code comprising instructions executable by a processor to perform a method of any of aspects 1 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving, from a network entity, an indication of a transmission configuration for transmitting temporally overlapping uplink shared channel messages;
    receiving, from the network entity, first signaling that schedules a first uplink shared channel message from the UE to the network entity within a first component carrier;
    receiving, from the network entity, second signaling that schedules a second uplink shared channel message from the UE to the network entity within the first component carrier, wherein the second uplink shared channel message is scheduled to at least partially overlap in time with the first uplink shared channel message, and wherein at least one of the first uplink shared channel message or the second uplink shared channel message comprises a configured grant uplink shared channel message; and
    transmitting, to the network entity, the first and second uplink shared channel messages at least partially overlapping in time in accordance with the transmission configuration for transmitting temporally overlapping uplink shared channel messages and based at least in part on the first and second uplink shared channel messages corresponding to different sounding reference signal resource set identifiers.

2. The method of claim 1, wherein transmitting the first and second uplink shared channel messages in accordance with the transmission configuration comprises:
    transmitting the first and second uplink shared channel messages based at least in part on a comparison of a first set of one or more parameters associated with the first uplink shared channel message and a second set of one or more parameters associated with the second uplink shared channel message, wherein the first set of one or more parameters, the second set of one or more parameters, or both, correspond to a grouping of uplink shared channel messages, comprise a logical channel priority, or both.

3. The method of claim 1, wherein transmitting the first and second uplink shared channel messages is based at least in part on the first uplink shared channel message being associated with a first sounding reference signal resource set identifier corresponding to a first uplink beam group and the second uplink shared channel message being associated with a second sounding reference signal resource set identifier corresponding to a second uplink beam group.

4. The method of claim 1, wherein transmitting the first and second uplink shared channel messages in accordance with the transmission configuration comprises:
    transmitting the first and second uplink shared channel messages based at least in part on the first uplink shared channel message being associated with a first set of uplink shared channel messages and the second uplink shared channel message being associated with a second set of uplink shared channel messages that is different from the first set of uplink shared channel messages.

5. The method of claim 4, further comprising:
    identifying that the first uplink shared channel message and the second uplink shared channel message belong to the first and second sets of uplink shared channel messages, respectively, based at least in part on a first control resource set pool index associated with the first uplink shared channel message being different than a second control resource set pool index associated with the second uplink shared channel message, wherein transmitting the first and second uplink shared channel messages in accordance with the transmission configuration is based at least in part on the identifying.

6. The method of claim 5, wherein the first uplink shared channel message comprises the configured grant uplink shared channel message and the first signaling comprises a radio resource control message, a downlink control information message, or both, the method further comprising:
identifying the first control resource set pool index associated with the first uplink shared channel message based at least in part on one or more parameters received via the radio resource control message, a control resource set associated with the downlink control information message, or both.

7. The method of claim 4, further comprising:
identifying that the first uplink shared channel message and the second uplink shared channel message belong to the first and second sets of uplink shared channel messages, respectively, based at least in part on a first uplink beam group associated with the first uplink shared channel message being different than a second uplink beam group associated with the second uplink shared channel message, wherein transmitting the first and second uplink shared channel messages in accordance with the transmission configuration is based at least in part on the identifying.

8. The method of claim 7, further comprising:
identifying the first uplink beam group, the second uplink beam group, or both, based on one or more parameters associated with the first uplink shared channel message and the second uplink shared channel message, the one or more parameters comprising a UE panel identifier, an uplink transmission configuration indicator, the sounding reference signal resource set identifiers corresponding to the first and second uplink shared channel messages, or any combination thereof.

9. The method of claim 4, further comprising:
identifying that the first uplink shared channel message and the second uplink shared channel message belong to the first and second sets of uplink shared channel messages, respectively, based at least in part on a first set of one or more parameters associated with the first uplink shared channel message being different than a second set of one or more parameters associated with the second uplink shared channel message, wherein transmitting the first and second uplink shared channel messages is based at least in part on the identifying, wherein the first set of one or more parameters is different from the second set of one or more parameters.

10. The method of claim 9, wherein the first set of one or more parameters, the second set of one or more parameters, or both, comprise an uplink power control closed loop index, an antenna port, a code division multiplexing group, a timing advance group identifier, a physical cell identifier, a synchronization signal block set, or any combination thereof.

11. The method of claim 1, further comprising:
receiving, from the network entity, third signaling that schedules a third uplink shared channel message from the UE to the network entity within the first component carrier, wherein the third uplink shared channel message is scheduled to at least partially overlap in time with the first uplink shared channel message; and
refraining from transmitting the third uplink shared channel message in accordance with the transmission configuration based at least in part on the first uplink shared channel message and the third uplink shared channel message being scheduled to at least partially overlap in time and being associated with a same set of uplink shared channel messages.

12. The method of claim 11, wherein the first uplink shared channel message comprises a dynamic grant uplink shared channel message, the method further comprising:
refraining from transmitting the third uplink shared channel message in accordance with the transmission configuration based at least in part on the third uplink shared channel message comprising a second configured grant uplink shared channel message.

13. The method of claim 11, further comprising:
refraining from transmitting the third uplink shared channel message in accordance with the transmission configuration based at least in part on the third uplink shared channel message having a second logical channel priority that is less than or equal to a first logical channel priority associated with the first uplink shared channel message.

14. The method of claim 11, wherein the first uplink shared channel message comprises a dynamic grant uplink shared channel message, wherein the third uplink shared channel message comprises a second configured grant uplink shared channel message, and wherein the first signaling that schedules the first uplink shared channel message comprises a downlink control information message, the method further comprising:
refraining from transmitting the third uplink shared channel message in accordance with the transmission configuration based at least in part on a time interval between the downlink control information message and the third uplink shared channel message satisfying a threshold time interval.

15. The method of claim 1, further comprising:
receiving, from the network entity, third signaling that schedules a third uplink shared channel message from the UE to the network entity within the first component carrier, wherein the third uplink shared channel message at least partially overlaps in time with the first and second uplink shared channel messages; and
refraining from transmitting the third uplink shared channel message in accordance with the transmission configuration based at least in part on the third uplink shared channel message being scheduled to at least partially overlap in time with the first and second uplink shared channel messages and based at least in part on a set of uplink shared channel messages associated with the third uplink shared channel message, a logical channel priority associated with the third uplink shared channel message, or both.

16. The method of claim 1, wherein the first uplink shared channel message comprises the configured grant uplink shared channel message, and wherein the second uplink shared channel message comprises a dynamic grant uplink shared channel message, the method further comprising:
receiving, from the network entity, third signaling that schedules a third uplink shared channel message from the UE to the network entity within the first component carrier, wherein the third uplink shared channel message is scheduled to at least partially overlap in time with the first and second uplink shared channel messages; and refraining from transmitting the third uplink shared channel message in accordance with the transmission configuration based at least in part on the third uplink shared channel message being scheduled to at least partially overlap in time with the first and second uplink shared channel messages, and based at least in part on both the first and third uplink shared channel messages comprising configured grant uplink shared channel messages.

17. The method of claim 16, further comprising:

refraining from transmitting the third uplink shared channel message in accordance with the transmission configuration based at least on part on a first set of one or more parameters associated with the first uplink shared channel message and a second set of one or more parameters associated with the third uplink shared channel message, wherein the first set of one or more parameters, the second set of one or more parameters, or both, comprises a configured grant index, a periodicity, an initial transmit time, a duration, a quantity of resource blocks, an extent of temporal overlap with the second uplink shared channel message, an extent of frequency overlap with the second uplink shared channel message, a demodulation reference signal symbol location, a code division multiplexing group, or any combination thereof.

18. The method of claim 16, wherein the third uplink shared channel message comprises a second configured grant uplink shared channel message, and wherein the second signaling that schedules the second uplink shared channel message comprises a downlink control information message, the method further comprising:

transmitting the first uplink shared channel message based at least in part on a first time interval between the downlink control information message and the first uplink shared channel message satisfying a threshold time interval.

19. The method of claim 1, further comprising:

receiving, from the network entity, third signaling that schedules a first dynamic grant uplink shared channel message and a second dynamic grant uplink shared channel message from the UE to the network entity within a second component carrier;

receiving, from the network entity, fourth signaling that schedules a second configured grant uplink shared channel message from the UE to the network entity within the second component carrier, wherein the second configured grant uplink shared channel message is configured to at least partially overlap in time with the first and second dynamic grant uplink shared channel messages; and refraining from transmitting the second configured grant uplink shared channel message based at least in part on the second configured grant uplink shared channel message being configured to at least partially overlap in time with the first and second dynamic grant uplink shared channel messages.

20. The method of claim 1, further comprising:

receiving, from the network entity, third signaling that schedules a third uplink shared channel message from the UE to the network entity within the first component carrier, wherein the third uplink shared channel message is scheduled to at least partially overlap in time with the first and second uplink shared channel messages; and refraining from transmitting the third uplink shared channel message based at least in part on the third uplink shared channel message being scheduled to at least partially overlap in time with the first and second uplink shared channel messages, and based at least in part on the third uplink shared channel message having a third logical channel priority that is less than or equal to a first logical channel priority associated with the first uplink shared channel message and a second logical channel priority associated with the second uplink shared channel message.

21. The method of claim 1, wherein the first uplink shared channel message comprises a first configured grant uplink shared channel message, and wherein the second uplink shared channel message comprises a second configured grant uplink shared channel message.

22. An apparatus for wireless communication comprising:

at least one processor of a user equipment (UE);

a transceiver coupled with the at least one processor; and memory coupled with the at least one processor, the memory and the at least one processor configured to cause the apparatus to:

receive, from a network entity via the transceiver, an indication of a transmission configuration for transmitting temporally overlapping uplink shared channel messages;

receive, from the network entity via the transceiver, first signaling that schedules a first uplink shared channel message from the UE to the network entity within a first component carrier;

receive, from the network entity via the transceiver, second signaling that schedules a second uplink shared channel message from the UE to the network entity within the first component carrier, wherein the second uplink shared channel message is scheduled to at least partially overlap in time with the first uplink shared channel message, and wherein at least one of the first uplink shared channel message or the second uplink shared channel message comprises a configured grant uplink shared channel message; and transmit, to the network entity via the transceiver, the first and second uplink shared channel messages at least partially overlapping in time in accordance with the transmission configuration for transmitting temporally overlapping uplink shared channel messages and based at least in part on the first and second uplink shared channel messages corresponding to different sounding reference signal resource set identifiers.

23. The apparatus of claim 22, wherein to transmit the first and second uplink shared channel messages in accordance with the transmission configuration, the memory and the at least one processor are configured to cause the apparatus to:

transmit, via the transceiver, the first and second uplink shared channel messages based at least in part on a comparison of a first set of one or more parameters associated with the first uplink shared channel message and a second set of one or more parameters associated with the second uplink shared channel message, wherein the first set of one or more parameters, the second set of one or more parameters, or both, correspond to a grouping of uplink shared channel messages, comprise a logical channel priority, or both.

24. The apparatus of claim 22, wherein transmitting the first and second uplink shared channel messages is based at least in part on the first uplink shared channel message being associated with a first sounding reference signal resource set identifier corresponding to a first uplink beam group and the second uplink shared channel message being associated with a second sounding reference signal resource set identifier corresponding to a second uplink beam group.

25. The apparatus of claim 22, wherein to transmit the first and second uplink shared channel messages in accordance with the transmission configuration, the memory and the at least one processor are configured to cause the apparatus to:
transmit, via the transceiver, the first and second uplink shared channel messages based at least in part on the first uplink shared channel message being associated with a first set of uplink shared channel messages and the second uplink shared channel message being associated with a second set of uplink shared channel messages that is different from the first set of uplink shared channel messages.

26. The apparatus of claim 25, wherein the memory and the at least one processor are further configured to cause the apparatus to:
identify that the first uplink shared channel message and the second uplink shared channel message belong to the first and second sets of uplink shared channel messages, respectively, based at least in part on a first control resource set pool index associated with the first uplink shared channel message being different than a second control resource set pool index associated with the second uplink shared channel message, wherein transmitting the first and second uplink shared channel messages in accordance with the transmission configuration is based at least in part on the identifying.

27. The apparatus of claim 26, wherein the first uplink shared channel message comprises the configured grant uplink shared channel message and the first signaling comprises a radio resource control message, a downlink control information message, or both, and wherein the memory and the at least one processor are further configured to cause the apparatus to:
identify the first control resource set pool index associated with the first uplink shared channel message based at least in part on one or more parameters received via the radio resource control message, a control resource set associated with the downlink control information message, or both.

28. The apparatus of claim 25, wherein the memory and the at least one processor are further configured to cause the apparatus to:
identify that the first uplink shared channel message and the second uplink shared channel message belong to the first and second sets of uplink shared channel messages, respectively, based at least in part on a first uplink beam group associated with the first uplink shared channel message being different than a second uplink beam group associated with the second uplink shared channel message, wherein transmitting the first and second uplink shared channel messages in accordance with the transmission configuration is based at least in part on the identifying.

29. An apparatus for wireless communication at a user equipment (UE), comprising:
means for receiving, from a network entity, an indication of a transmission configuration for transmitting temporally overlapping uplink shared channel messages;
means for receiving, from the network entity, first signaling that schedules a first uplink shared channel message from the UE to the network entity within a first component carrier;
means for receiving, from the network entity, second signaling that schedules a second uplink shared channel message from the UE to the network entity within the first component carrier, wherein the second uplink shared channel message is scheduled to at least partially overlap in time with the first uplink shared channel message, and wherein at least one of the first uplink shared channel message or the second uplink shared channel message comprises a configured grant uplink shared channel message; and
means for transmitting, to the network entity, the first and second uplink shared channel messages at least partially overlapping in time in accordance with the transmission configuration for transmitting temporally overlapping uplink shared channel messages and based at least in part on the first and second uplink shared channel messages corresponding to different sounding reference signal resource set identifier.

30. A non-transitory computer-readable medium storing code for wireless communication at a user equipment (UE), the code comprising instructions executable by at least one processor to cause the UE to:
receive, from a network entity, an indication of a transmission configuration for transmitting temporally overlapping uplink shared channel messages;
receive, from the network entity, first signaling that schedules a first uplink shared channel message from the UE to the network entity within a first component carrier;
receive, from the network entity, second signaling that schedules a second uplink shared channel message from the UE to the network entity within the first component carrier, wherein the second uplink shared channel message is scheduled to at least partially overlap in time with the first uplink shared channel message, and wherein at least one of the first uplink shared channel message or the second uplink shared channel message comprises a configured grant uplink shared channel message; and
transmit, to the network entity, the first and second uplink shared channel messages at least partially overlapping in time in accordance with the transmission configuration for transmitting temporally overlapping uplink shared channel messages and based at least in part on the first and second uplink shared channel messages corresponding to different sounding reference signal resource set identifier.

* * * * *